(12) United States Patent
Kodera et al.

(10) Patent No.: US 11,524,715 B2
(45) Date of Patent: Dec. 13, 2022

(54) STEERING DEVICE

(71) Applicants: JTEKT CORPORATION, Osaka (JP); TOYOTA JIDOSHA KABUSHIKI KAISHA, Toyota (JP)

(72) Inventors: Takashi Kodera, Okazaki (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/996,324

(22) Filed: Aug. 18, 2020

(65) Prior Publication Data
US 2021/0053613 A1    Feb. 25, 2021

(30) Foreign Application Priority Data
Aug. 22, 2019   (JP) .............................. JP2019-152194

(51) Int. Cl.
*B62D 5/04*   (2006.01)

(52) U.S. Cl.
CPC .................................. *B62D 5/0463* (2013.01)

(58) Field of Classification Search
CPC .................................................. B62D 5/0463
See application file for complete search history.

(56) References Cited

U.S. PATENT DOCUMENTS

| 8,924,084 B2 * | 12/2014 | Chai | ..................... B62D 6/008 |
| | | | 701/41 |
| 10,065,639 B2 * | 9/2018 | Taniguchi | ................. G01P 3/64 |
| 2017/0267276 A1 * | 9/2017 | Kodera | .................... B62D 6/04 |

FOREIGN PATENT DOCUMENTS

| EP | 1698540 A1 | 9/2006 |
| EP | 3406506 A1 | 11/2018 |
| JP | 2017-165219 A | 9/2017 |
| JP | 2019-127185 A | 8/2019 |
| WO | WO-2018190036 A1 * | 10/2018 ........... B62D 5/0463 |

OTHER PUBLICATIONS

Jan. 11, 2021 Extended Search Report issued in European Patent Application No. 20191332.4.

* cited by examiner

*Primary Examiner* — Jacob D Knutson
(74) *Attorney, Agent, or Firm* — Oliff PLC

(57) ABSTRACT

A steering device includes a turning shaft, a steering mechanism, a motor, and a control device. The control device includes a steering-range axial force calculating circuit, a limiting axial force calculating circuit, a final axial force calculating circuit, and an axial force adjusting circuit. The steering-range axial force calculating circuit calculates a steering-range axial force when a steering wheel is operated in a predetermined operation range. The limiting axial force calculating circuit calculates a limiting axial force. The final axial force calculating circuit calculates a final axial force. The axial force adjusting circuit adjusts a value of the steering-range axial force, the limiting axial force, or the final axial force based on the axial force that reflects the force acting on the turning shaft.

7 Claims, 7 Drawing Sheets

STEERING DEVICE

CROSS-REFERENCE TO RELATED APPLICATION

This application claims priority to Japanese Patent Application No. 2019-152194 filed on Aug. 22, 2019, incorporated herein by reference in its entirety.

BACKGROUND

1. Technical Field

The disclosure relates to a steering device.

2. Description of Related Art

A so-called steer-by-wire type steering device in which transmission of power between a steering wheel and turning wheels is cut off is known. Such a steering device includes a reaction motor which is a source of a steering reaction force which is applied to a steering shaft and a turning motor which is a source of a turning force for turning the turning wheels. When a vehicle travels, a control device for the steering device generates a steering reaction force using the reaction motor and turns the turning wheels using the turning motor.

In the steer-by-wire type steering device, since transmission of power between the steering wheel and the turning wheels is cut off, a road-surface reaction force acting on the turning wheels is less likely to be transmitted to the steering wheel. Accordingly, a driver does not feel a road-surface state as a response via the steering wheel well.

Therefore, for example, a control device described in Japanese Unexamined Patent Application Publication No. 2017-165219 (JP 2017-165219 A) calculates an ideal axial force which is an ideal rack axial force based on a target turning angle and a road-surface axial force which is an estimated value of a rack axial force based on a current value of a turning motor. The control device sums the ideal axial force and the road-surface axial force at a predetermined distribution ratio and controls a reaction motor using a base reaction force based on the summed axial force. Since the road-surface axial force reflects a road-surface state, a steering reaction force generated by the reaction motor also reflects the road-surface state. Accordingly, a driver can feel a road-surface state as a steering reaction force.

The control device calculates a limiting reaction force for virtually limiting an operation range of the steering wheel. The control device selects the larger one of a target steering angle and a target turning angle, and generates a limiting reaction force and rapidly increases the limiting reaction force when the selected target steering angle or the selected target turning angle reaches a threshold value. The threshold value is set based on the view that the steering reaction force is rapidly increased both immediately before a rack shaft turning the turning wheels reaches a limit position of a physical movable range thereof and immediately before the steering wheel reaches a limit position of the operation range which is determined by a spiral cable.

The control device calculates a final reaction force by summing the base reaction force and the limiting reaction force and controls the reaction motor using the final reaction force. Since the steering reaction force increases rapidly after the target steering angle or the target turning angle has reached the threshold value, a driver has difficulty operating the steering wheel in a direction in which the absolute value of a steering angle increases. Accordingly, it is possible to virtually form the operation range of the steering wheel and a movable range of the rack shaft.

SUMMARY

In the control device described in JP 2017-165219 A, there is the following concern. That is, the control device calculates the final reaction force which is used to control the reaction motor by adding a limiting reaction force to the base reaction force when the limiting reaction force is calculated. Accordingly, a greater steering reaction force than necessary may be given to a driver because the limiting reaction force is added to the base reaction force. This phenomenon is likely to occur, for example, when a limiting reaction force is added in a state in which a distribution proportion of the road-surface axial force in the base reaction force is greater, that is, a state in which the road-surface axial force is dominant, such as a state in which a vehicle turns greatly at a low speed.

The disclosure enables a more appropriate steering feeling to be given to a driver.

An aspect of the disclosure provides a steering device. The steering device includes: a turning shaft configured to turn turning wheels; a steering mechanism including the turning shaft; a motor configured to generate drive power that is applied to the steering mechanism; and a control device configured to control the motor based on a command value that is calculated according to a steered state. The control device includes a steering-range axial force calculating circuit, a limiting axial force calculating circuit, a final axial force calculating circuit, and an axial force adjusting circuit. The steering-range axial force calculating circuit is configured to calculate a steering-range axial force including an axial force that reflects at least a force acting on the turning shaft via the turning wheels when a steering wheel is operated in a predetermined operation range. The limiting axial force calculating circuit is configured to calculate a limiting axial force that is an axial force for virtually limiting an operation of the steering wheel. The final axial force calculating circuit is configured to calculate a final axial force that is a final axial force reflected in the command value based on the steering-range axial force and the limiting axial force. The axial force adjusting circuit is configured to adjust a value of the steering-range axial force, the limiting axial force, or the final axial force based on the axial force that reflects the force acting on the turning shaft when the final axial force reflects the limiting axial force.

With this configuration, when the final axial force reflects the limiting axial force, a more appropriate final axial force is acquired by adjusting the value of the steering-range axial force, the limiting axial force, or the final axial force according to the axial force that reflects a force acting on the turning shaft. More appropriate driving power is applied to a steering mechanism of a vehicle by reflecting the appropriate final axial force in the command value. Accordingly, it is possible to give a more appropriate steering feeling to a driver.

In the steering device, the axial force adjusting circuit may be configured to decrease a degree of reflection of the steering-range axial force or the limiting axial force in the final axial force according to a ratio at which the axial force that reflects a force acting on the turning shaft occupies the steering-range axial force when the final axial force reflects the limiting axial force.

With this configuration, when the final axial force reflects the limiting axial force, a degree of reflection of the steering-range axial force or the limiting axial force in the final axial force is decreased according to the ratio at which the axial force that reflects a force acting on the turning shaft occupies the steering-range axial force. Accordingly, unlike a case in which both the steering-range axial force and the limiting axial force are used without change to calculate the final axial force, it is possible to curb calculation of the final axial force with an excessive value. By reflecting the appropriate final axial force in the command value, it is possible to give a more appropriate steering feeling to a driver.

In the steering device, the steering-range axial force may be acquired by mixing a first axial force that reflects a force acting on the turning shaft and a second axial force that does not reflect a force acting on the turning shaft at a ratio which is set according to a vehicle state. The axial force adjusting circuit may be configured to decrease the value of the limiting axial force according to the ratio of the steering-range axial force that the first axial force occupies when the final axial force reflects the limiting axial force.

With this configuration, since the value of the limiting axial force is decreased according to the ratio of the steering-range axial force that the first axial force occupies when the final axial force reflects the limiting axial force in the final axial force, it is possible to curb calculation of the final axial force with an excessive value.

In the steering device, the steering-range axial force may be acquired by mixing a first axial force that reflects a force acting on the turning shaft and a second axial force that does not reflect a force acting on the turning shaft at a ratio that is set according to a vehicle state. The axial force adjusting circuit may be configured to decrease the value of the second axial force or the steering-range axial force according to the ratio of the steering-range axial force that the first axial force occupies when the final axial force reflects the limiting axial force.

With this configuration, since the value of the second axial force or the steering-range axial force is decreased according to the ratio of the steering-range axial force that the first axial force occupies when the final axial force reflects the limiting axial force, it is possible to curb calculation of the final axial force with an excessive value.

In the steering device, the final axial force calculating circuit may be configured to calculate the final axial force by summing the steering-range axial force and the limiting axial force. According to this configuration, since the steering-range axial force and the limiting axial force are summed, the final axial force with an excessive value is likely to be calculated. Accordingly, a configuration including the axial force adjusting unit as a steering control device can be preferably employed.

In the steering device, the limiting axial force calculating circuit may be configured to calculate at least one of a first limiting axial force, a second limiting axial force, and a third limiting axial force. The first limiting axial force is an axial force for virtually limiting the operation range of the steering wheel. The second limiting axial force may be an axial force for virtually limiting the operation of the steering wheel when a turning operation of the turning wheels is limited. The third limiting axial force may be an axial force for virtually limiting the operation of the steering wheel when a torque of the motor is limited to a value less than a torque that is inherently generated.

With this configuration, when at least one of the first limiting axial force, the second limiting axial force, and the final axial force reflects the third limiting axial force, the final axial force with an excessive value is likely to be calculated. Accordingly, a configuration including the axial force adjusting unit as a steering control device can be preferably employed.

In the steering device, the steering mechanism may have a structure in which transmission of power between the steering wheel and the turning wheels is cut off or a structure in which transmission of power between the steering wheel and the turning wheels is intermittent. The motor may be a reaction motor that generates a steering reaction force which is a torque in a direction opposite to an operation direction of the steering wheel as the drive power.

With this configuration, since the command value reflects a more appropriate final axial force, it is possible to give a more appropriate steering reaction force to a driver. In the steering device, the steering mechanism may have a structure in which the steering wheel and the turning wheels are connected in a power-transmittable manner. The motor may be an assist motor that generates a steering assist force which is a torque in a direction parallel to an operation direction of the steering wheel as the drive power.

With this configuration, since the command value reflects a more appropriate final axial force, it is possible to give a more appropriate steering assist force to a driver.

With the steering device according to the disclosure, it is possible to give a more appropriate steering feeling to a driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment in which a steering control device is applied to a steer-by-wire type steering device will be described.

Figure 1:
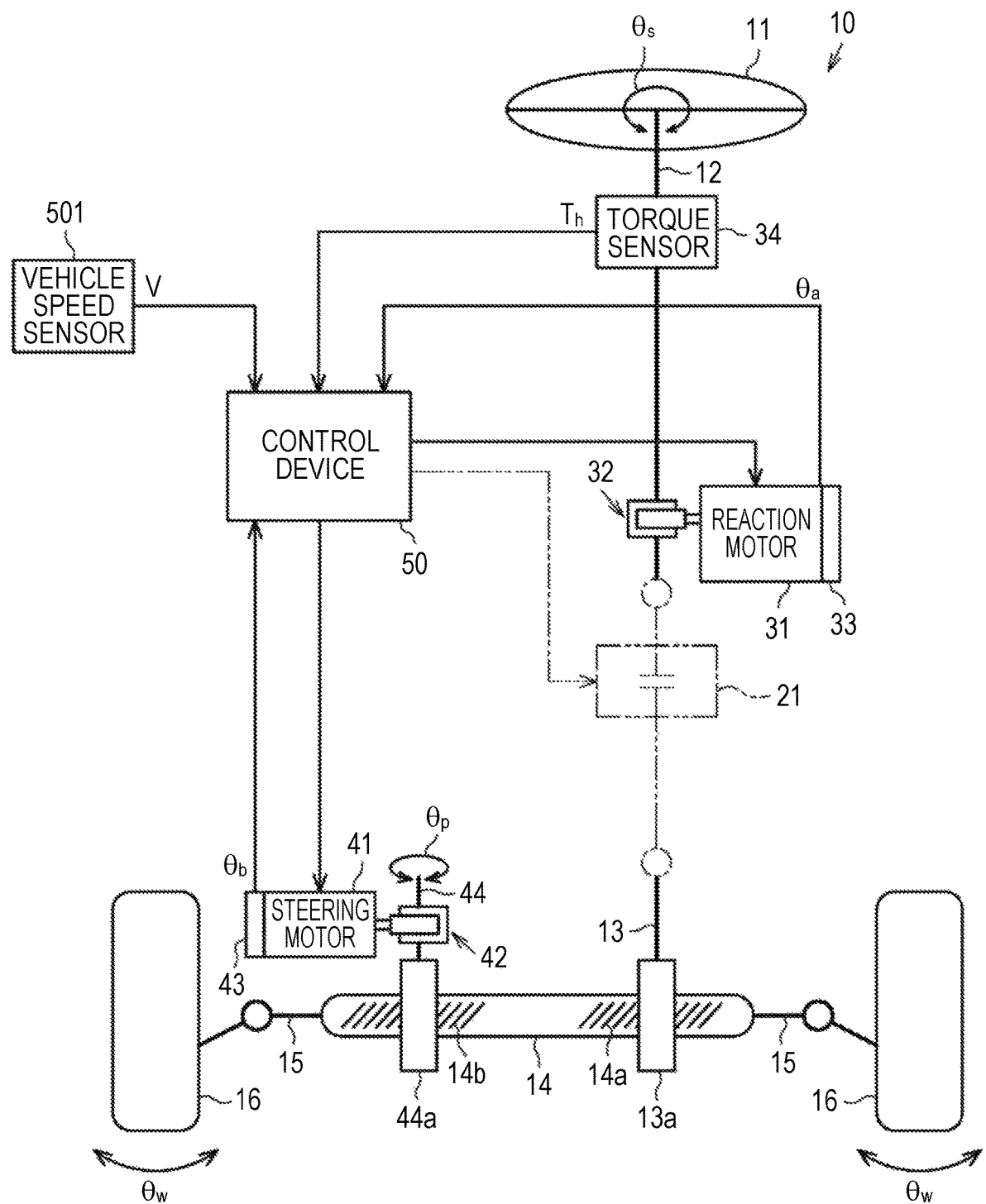
FIG. 1 is a diagram illustrating a configuration of a steer-by-wire type steering device in which a steering control device according to a first embodiment is mounted.

As illustrated in FIG. 1, a steering device 10 of a vehicle includes a steering shaft 12 that is connected to a steering wheel 11. The steering device 10 includes a turning shaft 14 that extends in a vehicle width direction (a right-left direction in FIG. 1). Right and left turning wheels 16 are connected to both ends of the turning shaft 14 via tie rods 15 and 15. By linearly moving the turning shaft 14, a turning angle θw of the turning wheels 16 is changed. The steering shaft 12 and the turning shaft 14 constitute a steering mechanism of the vehicle.

The steering device 10 includes a reaction motor 31, a reduction gear mechanism 32, a rotational angle sensor 33, and a torque sensor 34 as elements for generating a steering reaction force. In addition, a steering reaction force is a force that acts in a direction opposite to a direction in which the steering wheel 11 is operated by a driver. By applying the steering reaction force to the steering wheel 11, it is possible to give an appropriate feeling of response to a driver.

The reaction motor 31 is a source of a steering reaction force. For example, a three-phase brushless motor is employed as the reaction motor 31. The reaction motor 31 (accurately, a rotation shaft thereof) is connected to the steering shaft 12 via the reduction gear mechanism 32. A torque of the reaction motor 31 is applied as a steering reaction force to the steering shaft 12.

The rotational angle sensor 33 is provided in the reaction motor 31. The rotational angle sensor 33 detects a rotational angle θa of the reaction motor 31. The rotational angle θa of the reaction motor 31 is used to calculate a steering angle θs. The reaction motor 31 and the steering shaft 12 operate cooperatively via the reduction gear mechanism 32. Accordingly, the rotational angle θa of the reaction motor 31 and the rotational angle of the steering shaft 12 have correlations with a steering angle θs which is a rotational angle of the steering wheel 11. Accordingly, the steering angle θs can be calculated based on the rotational angle θa of the reaction motor 31.

The torque sensor 34 detects a steering torque Th which is applied to the steering shaft 12 by a rotational operation of the steering wheel 11. The torque sensor 34 is provided in a part of the steering shaft 12 which is closer to the steering wheel 11 than the reduction gear mechanism 32.

The steering device 10 includes a turning motor 41, a reduction gear mechanism 42, and a rotational angle sensor 43 as elements for generating a turning force which is power for turning the turning wheels 16.

The turning motor 41 is a source of a turning force. For example, a three-phase brushless motor is employed as the turning motor 41. A rotation shaft of the turning motor 41 is connected to a pinion shaft 44 via the reduction gear mechanism 42. Pinion teeth 44a of the pinion shaft 44 engage with rack teeth 14b of the turning shaft 14. A torque of the turning motor 41 is applied as the turning force to the turning shaft 14 via the pinion shaft 44. With rotation of the turning motor 41, the turning shaft 14 moves in the vehicle width direction which is the right-left direction in FIG. 1.

The rotational angle sensor 43 is provided in the turning motor 41. The rotational angle sensor 43 detects a rotational angle θb of the turning motor 41. In addition, the steering device 10 includes a pinion shaft 13. The pinion shaft 13 is provided to cross the turning shaft 14. Pinion teeth 13a of the pinion shaft 13 engage with rack teeth 14a of the turning shaft 14. The pinion shaft 13 is provided so that the turning shaft 14 along with a pinion shaft 44 is supported in a housing which is not illustrated. That is, the turning shaft 14 is supported to be movable in an axial direction thereof by a support mechanism (not illustrated) which is provided in the steering device 10, and is pressed toward the pinion shafts 13 and 44. Accordingly, the turning shaft 14 is supported in the housing. Another support mechanism that supports the turning shaft 14 in the housing without using the pinion shaft 13 may be provided.

The steering device 10 includes a control device 50. The control device 50 controls the reaction motor 31 and the turning motor 41 based on results of detection from various sensors which are mounted in the vehicle. The sensors include a vehicle speed sensor 501 in addition to the rotational angle sensor 33, the torque sensor 34, and the rotational angle sensor 43. The vehicle speed sensor 501 detects a vehicle speed V which is a traveling speed of the vehicle.

The control device 50 performs reaction force control for generating a steering reaction force based on the steering torque Th by controlling driving of the reaction motor 31. The control device 50 calculates a target steering reaction force based on the steering torque Th and the vehicle speed V and calculates a steering reaction force command value based on the calculated target steering reaction force. The control device 50 supplies a current which is required to generate a steering reaction force based on the steering reaction force command value to the reaction motor 31.

The control device 50 performs turning control for turning the turning wheels 16 according to a steered state by controlling driving of the turning motor 41. The control device 50 calculates a pinion angle θp which is an actual rotational angle of the pinion shaft 44 based on the rotational angle θb of the turning motor 41 which is detected by the rotational angle sensor 43. The pinion angle θp is a value that reflects a turning angle θw of the turning wheels 16. The control device 50 calculates a steering angle θs based on the rotational angle θa of the reaction motor 31 which is detected by the rotational angle sensor 33, and calculates a target pinion angle which is a target value of the pinion angle θp based on the calculated steering angle θs. Then, the control device 50 calculates a difference between the target pinion angle and the actual pinion angle θp and controls supply of electric power to the turning motor 41 such that the difference is cancelled.

Figure 2:
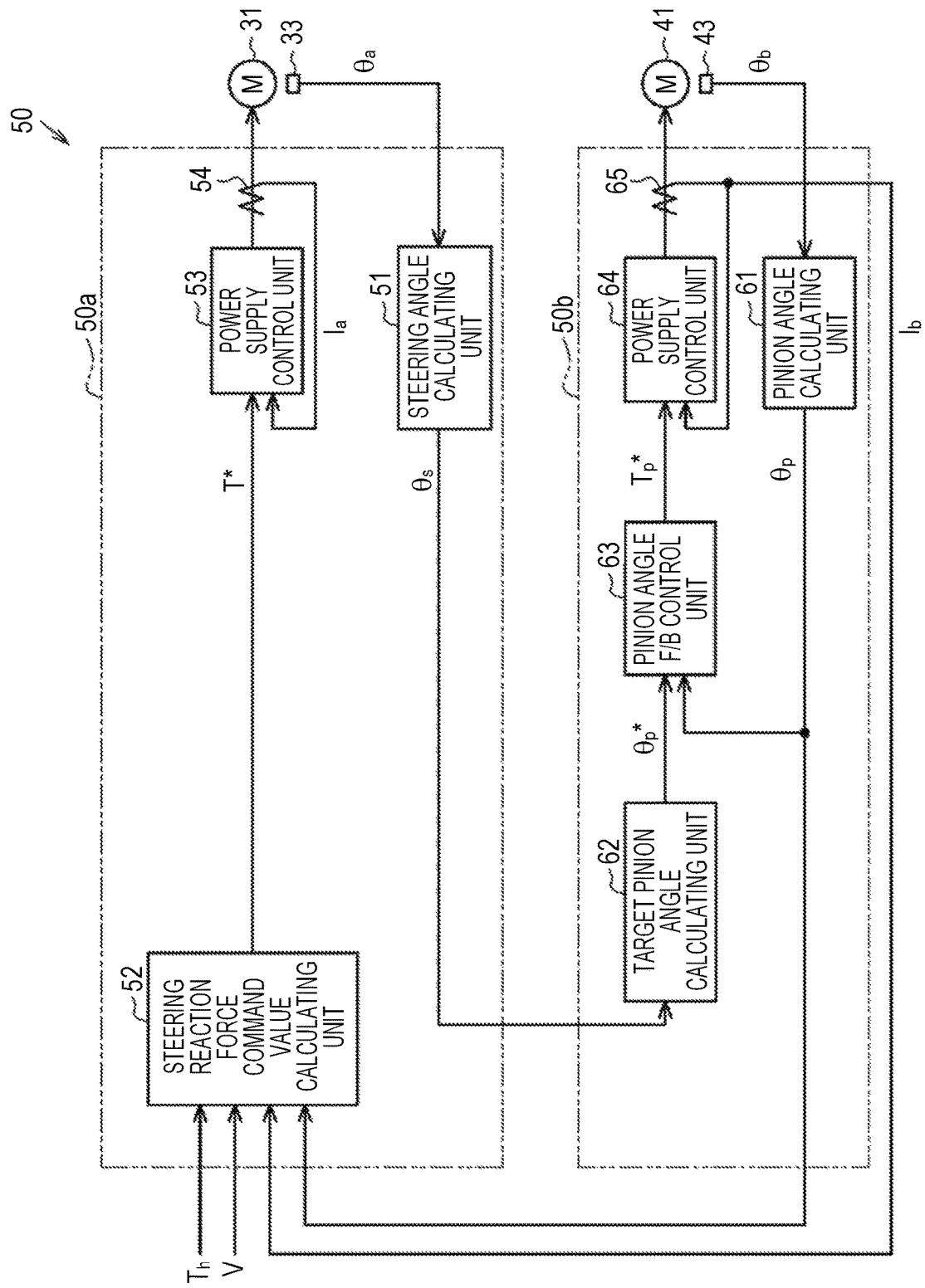
FIG. 2 is a control block diagram illustrating a control device according to the first embodiment.

The control device 50 will be described below in detail. As illustrated in FIG. 2, the control device 50 includes a reaction force control unit 50a that performs reaction force control and a turning control unit 50b that performs turning control.

The reaction force control unit 50a includes a steering angle calculating unit 51, a steering reaction force command value calculating unit 52, and a power supply control unit 53. The steering angle calculating unit 51 calculates the steering angle θs of the steering wheel 11 based on the rotational angle θa of the reaction motor 31 which is detected by the rotational angle sensor 33.

The steering reaction force command value calculating unit 52 calculates a steering reaction force command value T* based on the steering torque Th and the vehicle speed V. The steering reaction force command value calculating unit 52 calculates the steering reaction force command value T* such that the absolute value thereof becomes greater as the absolute value of the steering torque Th becomes greater and as the vehicle speed V becomes lower. Details of the steering reaction force command value calculating unit 52 will be described later.

The power supply control unit 53 supplies electric power based on the steering reaction force command value T* to the reaction motor 31. Specifically, the power supply control unit 53 calculates a current command value for the reaction motor 31 based on the steering reaction force command value T*. The power supply control unit 53 detects an actual value of a current Ia flowing in a power supply path to the reaction motor 31 using a current sensor 54 which is provided in the power supply path. The value of the current Ia is an actual value of a current which is supplied to the reaction motor 31. The power supply control unit 53 calculates a difference between the current command value and the actual value of the current Ia and controls supply of electric power to the reaction motor 31 such that the difference is cancelled. Accordingly, the reaction motor 31 generates a torque based on the steering reaction force command value T*. An appropriate feeling of response based on a road-surface reaction force can be given to a driver.

The turning control unit 50b includes a pinion angle calculating unit 61, a target pinion angle calculating unit 62, a pinion angle feedback control unit 63, and a power supply control unit 64. The pinion angle calculating unit 61 calculates a pinion angle θp which is an actual rotational angle of the pinion shaft 44 based on the rotational angle θb of the turning motor 41 which is detected by the rotational angle sensor 43. The turning motor 41 and the pinion shaft 44 operate cooperatively via the reduction gear mechanism 42. Accordingly, there is a correlation between the rotational angle θb of the turning motor 41 and the pinion angle θp. The pinion angle θp can be calculated from the rotational angle θb of the turning motor 41 using this correlation. The pinion shaft 44 engages with the turning shaft 14. Accordingly, there is also a correlation between the pinion angle θp and an amount of movement of the turning shaft 14. That is, the pinion angle θp is a value that reflects the turning angle θw of the turning wheels 16.

The target pinion angle calculating unit 62 calculates a target pinion angle θp* based on the steering angle θs which is calculated by the steering angle calculating unit 51. In this embodiment, the target pinion angle calculating unit 62 sets the target pinion angle θp* to the same value as the steering angle θs. That is, a steering angle ratio which is a ratio of the turning angle θw to the steering angle θs is "1:1."

In addition, the target pinion angle calculating unit 62 may set the target pinion angle θp* to a value other than the steering angle θs. That is, the target pinion angle calculating unit 62 sets the steering angle ratio which is the ratio of the turning angle θw to the steering angle θs according to the traveling state of the vehicle such as a vehicle speed V, and calculates the target pinion angle θp* according to the set steering angle ratio. The target pinion angle calculating unit 62 calculates the target pinion angle θp* such that the turning angle θw becomes greater than the steering angle θs as the vehicle speed V becomes lower and the turning angle θw becomes less than the steering angle θs as the vehicle speed V becomes higher. In order to realize the steering angle ratio which is set according to the traveling state of the vehicle, the target pinion angle calculating unit 62 calculates the target pinion angle θp* based on the steering angle ratio by calculating a correction angle for the steering angle θs and adding the calculated correction angle to the steering angle θs.

The pinion angle feedback control unit 63 receives the target pinion angle θp* calculated by the target pinion angle calculating unit 62 and an actual pinion angle θp calculated by the pinion angle calculating unit 61. The pinion angle feedback control unit 63 calculates a pinion angle command value Tp* by feedback control of the pinion angle θp such that the actual pinion angle θp follows the target pinion angle θp*.

The power supply control unit 64 supplies electric power based on the pinion angle command value Tp* to the turning motor 41. Specifically, the power supply control unit 64 calculates a current command value for the turning motor 41 based on the pinion angle command value Tp*. The power supply control unit 64 detects an actual value of the current Ib which is generated in a power supply path to the turning motor 41 using the current sensor 65 which is provided in the power supply path. The value of the current Ib is an actual value of the current which is supplied to the turning motor 41. Then, the power supply control unit 64 calculates a difference between the current command value and the actual value of the current Ib and controls supply of electric power to the turning motor 41 such that the difference is cancelled. Accordingly, the turning motor 41 rotates by an angle corresponding to the pinion angle command value Tp*.

Figure 3:
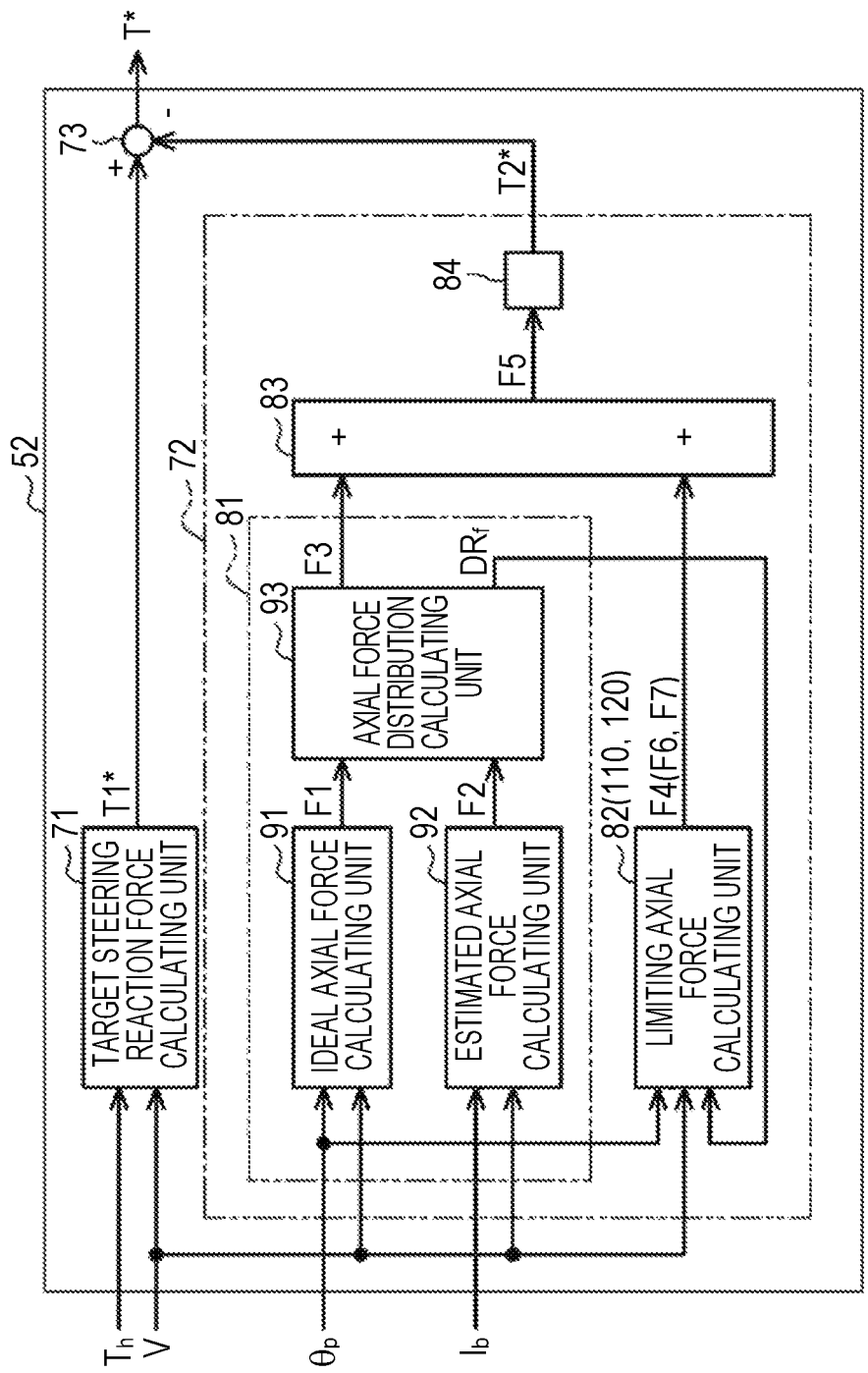
FIG. 3 is a control block diagram illustrating a steering reaction force command value calculating unit according to the first embodiment.

The steering reaction force command value calculating unit 52 will be described below in detail. As illustrated in FIG. 3, the steering reaction force command value calculating unit 52 includes a target steering reaction force calculating unit 71, an axial force calculating unit 72, and a subtractor 73.

The target steering reaction force calculating unit 71 calculates a target steering reaction force T1* based on the steering torque Th and the vehicle speed V. The target steering reaction force T1* is a target value of a torque generated by the reaction motor 31 and applied in a direction opposite to the operation direction of the steering wheel 11. The target steering reaction force calculating unit 71 calculates the target steering reaction force T1* such that the absolute value thereof becomes greater as the absolute value of the steering torque Th becomes greater and as the vehicle speed V becomes lower.

The axial force calculating unit 72 calculates an axial force acting on the turning shaft 14 via the turning wheel 16 based on the pinion angle θp, the value of the current Ib of the turning motor 41, and the vehicle speed V, and calculates a converted torque value (a steering reaction force based on the axial force) T2* obtained by converting the calculated axial force to a torque.

The subtractor 73 calculates the steering reaction force command value T* by subtracting the converted torque value T2* calculated by the axial force calculating unit 72 from the target steering reaction force T1* calculated by the target steering reaction force calculating unit 71.

The axial force calculating unit 72 will be described below in detail. The axial force calculating unit 72 includes a mixed axial force calculating unit 81, a limiting axial force calculating unit 82, an adder 83, and a converter 84. The mixed axial force calculating unit 81 includes an ideal axial force calculating unit 91, an estimated axial force calculating unit 92, and an axial force distribution calculating unit 93.

The ideal axial force calculating unit 91 calculates an ideal axial force F1 which is an ideal value of an axial force which is applied to the turning shaft 14 via the turning wheels 16 based on the pinion angle θp. The ideal axial force calculating unit 91 calculates the ideal axial force F1 using an ideal axial force map which is stored in a storage unit of the control device 50. The ideal axial force map is a map in which the horizontal axis represents the pinion angle θp and the vertical axis represents the ideal axial force F1, and defines a relationship between the pinion angle θp and the ideal axial force F1 according to the vehicle speed V. The ideal axial force map has the following characteristics. That is, the ideal axial force F1 is set such that the absolute value thereof becomes greater as the absolute value of the pinion angle θp becomes greater and as the vehicle speed V becomes lower. The ideal axial force F1 is set to the same sign as the sign of the pinion angle θp. The absolute value of the ideal axial force F1 increases linearly with an increase in the absolute value of the pinion angle θp. The ideal axial force F1 is an axial force that does not reflect a road-surface state or a force applied to the turning shaft 14 via the turning wheels 16.

The estimated axial force calculating unit 92 calculates an estimated axial force F2 which is applied to the turning shaft 14 based on the value of the current Ib of the turning motor 41. Here, the value of the current Ib of the turning motor 41 changes based on a difference between the target pinion angle θp* and the actual pinion angle θp due to a disturbance acting on the turning wheels 16 based on a road-surface state such as a road-surface frictional resistance. That is, the value of the current Ib of the turning motor 41 reflects the actual road-surface state acting on the turning wheels 16. Accordingly, it is possible to calculate an axial force that reflects an influence of the road-surface state based on the value of the current Ib of the turning motor 41. The estimated axial force F2 is calculated by multiplying the value of the current Ib of the turning motor 41 by a gain which is a coefficient based on the vehicle speed V. The estimated axial force F2 is an axial force that reflects the road-surface state or the force applied to the turning shaft 14 via the turning wheels 16.

The axial force distribution calculating unit 93 individually sets the distribution proportions for the ideal axial force F1 and the estimated axial force F2 according to various state parameters that reflect vehicle behavior, the road-surface state, or the steered state. The axial force distribution calculating unit 93 calculates a mixed axial force F3 by adding values obtained by multiplying the ideal axial force F1 and the estimated axial force F2 by the distribution proportions which are individually set. The axial force distribution calculating unit 93 supplies the distribution proportion DRf of the estimated axial force F2 to the limiting axial force calculating unit 82.

The distribution proportion may be set based on only the vehicle speed V which is one vehicle state parameter. In this case, for example, as the vehicle speed V becomes higher, the distribution proportion of the ideal axial force F1 is set to be greater and the distribution proportion of the estimated axial force F2 is set to be less. As the vehicle speed V becomes lower, the distribution proportion of the ideal axial force F1 is set to be less and the distribution proportion of the estimated axial force F2 is set to be greater.

The limiting axial force calculating unit 82 calculates a limiting axial force F4 for virtually limiting an operation range of the steering wheel 11 based on the pinion angle θp. The limiting axial force F4 is calculated based the view that a torque in a direction opposite to the steering direction which is generated by the reaction motor 31 is rapidly increased when the operation position of the steering wheel 11 approaches a limit position of the operation range or when the turning shaft 14 approaches a limit position of a physical movable range thereof. The limit position of the operation range of the steering wheel 11 is determined, for example, by a length of a spiral cable which is provided in the steering wheel 11. The limit position of the physical movable range of the turning shaft 14 is a position at which the movable range of the turning shaft 14 is physically regulated due to occurrence of so-called "end contact" in which a rack end that is an end of the turning shaft 14 comes into contact with a housing that is not illustrated. The limiting axial force F4 is set to the same sign as the sign of the pinion angle θp.

The adder 83 calculates a final axial force F5 which is a final axial force used to calculate the steering reaction force command value T* by summing the mixed axial force F3 calculated by the mixed axial force calculating unit 81 and the limiting axial force F4 calculated by the limiting axial force calculating unit 82.

The converter 84 calculates a converted torque value T2* by converting the final axial force F5 calculated by the adder 83 to a torque. Here, when the operation position of the steering wheel 11 has not approached the limit position of the operation range or when the turning shaft 14 has not approached the limit position of the physical movable range thereof, the limiting axial force calculating unit 82 does not calculate the limiting axial force F4. Accordingly, the mixed axial force F3 calculated by the mixed axial force calculating unit 81 is set as the final axial force F5. In this case, since the converted torque value T2* obtained by converting the final axial force F5 to a torque is reflected in the steering reaction force command value T*, a steering reaction force corresponding to the vehicle behavior or the road-surface state can be applied to the steering wheel 11. A driver can understand the vehicle behavior or the road-surface state by feeling the steering reaction force via the steering wheel 11 as a response.

When the operation position of the steering wheel 11 approaches the limit position of the operation range or when the turning shaft 14 approaches the limit position of the physical movable range thereof, the limiting axial force calculating unit 82 calculates the limiting axial force F4. Accordingly, a value obtained by adding the limiting axial force F4 calculated by the limiting axial force calculating unit 82 to the mixed axial force F3 calculated by the mixed axial force calculating unit 81 is set as the final axial force F5. In this case, since the steering reaction force command value T* reflects the converted torque value T2* obtained by converting the final axial force F5 to at torque, the steering reaction force increases rapidly. Accordingly, a driver has difficulty operating the steering wheel 11 in a direction in which the absolute value of the steering angle θs increases. Accordingly, the driver can recognize that the steering wheel 11 has reached the limit position of the virtual operation range by feeling a feeling of hitting an end as a steering reaction force (a response).

When the operation position of the steering wheel 11 approaches the limit position of the operation range or when the turning shaft 14 approaches the limit position of the physical movable range thereof, there is concern that the final axial force F5 with an excessive value, that is, the converted torque value T2* with an excessive value, will be calculated by summing the mixed axial force F3 and the limiting axial force F4. In this case, a greater steering reaction force than necessary may be applied to a driver. This phenomenon is likely to occur, for example, when the limiting axial force F4 is added in a state in which a distribution proportion at which the estimated axial force F2 occupies the mixed axial force F3 is greater, that is, a state in which the estimated axial force F2 is dominant, such as when the vehicle turns greatly at a low speed. This is because a slope which is a ratio of an increase of the estimated axial force F2 to an increase of the absolute value of the steering angle θs changes according to the road-surface state such as a road-surface frictional resistance and the estimated axial force F2 becomes greater, for example, as the road-surface frictional resistance becomes greater and as the value of the steering angle θs becomes greater.

Figure 4:
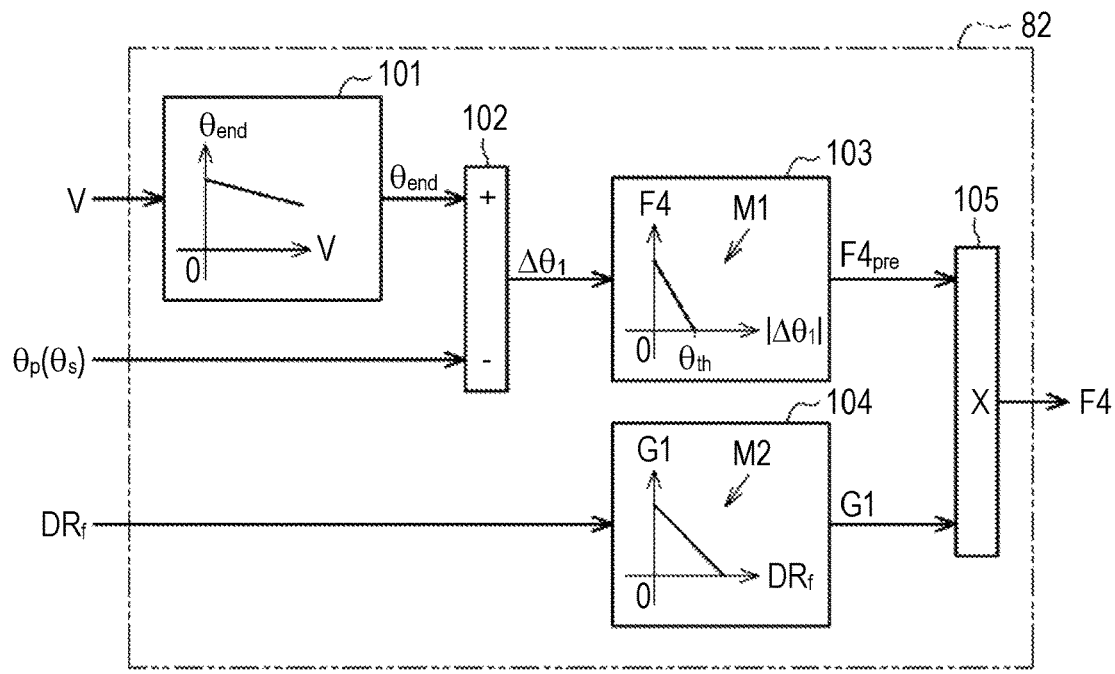
FIG. 4 is a control block diagram illustrating a limiting axial force calculating unit according to the first embodiment.

Therefore, in this embodiment, the limiting axial force calculating unit 82 employs the following configuration. As illustrated in FIG. 4, the limiting axial force calculating unit 82 includes a virtual rack-end angle calculating unit 101, a subtractor 102, a virtual rack-end axial force calculating unit 103, a gain calculating unit 104, and a multiplier 105.

The virtual rack-end angle calculating unit 101 calculates a virtual rack-end angle θend according to the vehicle speed V. The virtual rack-end angle calculating unit 101 calculates the virtual rack-end angle θend to have a smaller absolute value as the vehicle speed V becomes higher. The virtual rack-end angle θend is a steering angle corresponding to the limit position of the virtual operation range of the steering wheel 11 or a pinion angle corresponding to the limit position of the virtual movable range of the turning shaft 14. The virtual rack-end angle θend is set based on a close value of the steering angle θs when the steering wheel 11 reaches the limit position of the operation range thereof or the pinion angle θp when the turning shaft 14 reaches the limit position of the movable range thereof.

The subtractor 102 calculates an angle difference Δθ1 by subtracting the pinion angle θp calculated by the pinion angle calculating unit 61 from the virtual rack-end angle θend calculated by the virtual rack-end angle calculating unit 101. The subtractor 102 may calculate an angle difference Δθ1 by subtracting the steering angle θs calculated by the steering angle calculating unit 51 from the virtual rack-end angle θend.

The virtual rack-end axial force calculating unit 103 calculates a virtual rack-end axial force F4pre according to the angle difference Δθ1 calculated by the subtractor 102. The virtual rack-end axial force calculating unit 103 calculates the virtual rack-end axial force F4pre using a limiting axial force map M1 which is stored in the storage unit of the control device 50. The limiting axial force map M1 is a map in which the horizontal axis represents the angle difference Δθ1 and the vertical axis represents the virtual rack-end axial force F4pre, and defines a relationship between the angle difference Δθ1 and the virtual rack-end axial force F4pre. The limiting axial force map M1 has the following characteristics. That is, when the absolute value of the angle difference Δθ1 is equal to or less than an end determination threshold value θth which is set with respect to "0," the virtual rack-end axial force F4pre is generated and the virtual rack-end axial force F4pre increases rapidly in a direction in which the absolute value thereof increases as the absolute value of the angle difference Δθ1 decreases to "0." When the absolute value of the angle difference Δθ1 is greater than the end determination threshold value θth, the value of the virtual rack-end axial force F4pre is maintained at "0." The virtual rack-end axial force F4pre is set the same sign as the sign of the pinion angle θp.

The gain calculating unit 104 calculates a gain G1 according to the distribution proportion DRf of the estimated axial force F2 calculated by the axial force distribution calculating unit 93. The gain calculating unit 104 calculates the gain G1 using a gain map M2 which is stored in the storage unit of the control device 50. The gain map M2 is a map in which the horizontal axis represents the distribution proportion DRf of the estimated axial force F2 and the vertical axis represents the gain G1, and defines a relationship between the distribution proportion DRf and the gain G1. The gain map M2 has the following characteristics. That is, the value of the gain G1 decreases gradually to "0" as the value of the distribution proportion DRf increases from "0."

The multiplier 105 calculates the limiting axial force F4 by multiplying the virtual rack-end axial force F4pre calculated by the virtual rack-end axial force calculating unit 103 by the gain G1 calculated by the gain calculating unit 104.

In this embodiment, the mixed axial force calculating unit 81 constitutes a steering-range axial force calculating unit that calculates a steering-range axial force according to a vehicle state including a turned state of the turning wheels 16 or the like. The steering-range axial force calculating unit is an example of a "steering-range axial force calculating circuit" in the claims. The steering-range axial force is an axial force which is applied to the turning shaft 14 when the steering wheel 11 is operated in the operation range which is determined as a steering range in which it is normally operated. The adder 83 corresponds to the final axial force calculating unit that calculates the final axial force F5 which is a final axial force reflected in the steering reaction force command value T*. The final axial force calculating unit is an example of a "final axial force calculating circuit" in the claims. The gain calculating unit 104 and the multiplier 105 constitute the axial force adjusting unit that adjusts the value of the limiting axial force F4 based on the estimated axial force F2 which is an axial force that reflects a force applied to the turning shaft 14 when the final axial force F5 reflects the limiting axial force F4. The axial force adjusting unit is an example of an "axial force adjusting circuit" in the claims. The estimated axial force F2 is an example of a first axial force that reflects the force applied to the turning shaft 14, and the ideal axial force F1 is an example of a second axial force that does not reflect the force applied to the turning shaft 14. The limiting axial force F4 is an example of a first limiting axial force for virtually limiting the operation range of the steering wheel 11. The limiting axial force calculating unit is an example of a "limiting axial force calculating circuit" in the claims.

Operations in First Embodiment

The operations in the first embodiment will be described below. After the pinion angle θp has approached the virtual rack-end angle θend and the angle difference Δθ1 which is a difference between the virtual rack-end angle θend and the pinion angle θp has become equal to or less than the end determination threshold value θth, the limiting axial force F4 increases rapidly with a decrease of the angle difference Δθ1. Since the limiting axial force F4 is added to the mixed axial force F3, there is concern that the final axial force F5 with an excessive value will be calculated. This is because the ideal axial force F1 is merely a value corresponding to the pinion angle θp and the estimated axial force F2 increases with an increase of a road-surface frictional resistance. Particularly, when the limiting axial force F4 is added in a state in which the distribution proportion DRf of the estimated axial force F2 by which the mixed axial force F3 is occupied becomes greater, that is, a state in which the estimated axial force F2 is dominant, the final axial force F5 is likely to have an excessive value.

In this regard, according to the first embodiment, the value of the limiting axial force F4 changes according to the distribution proportion DRf which is a proportion of the estimated axial force F2 that occupies the mixed axial force F3. That is, the limiting axial force F4 is calculated by multiplying the virtual rack-end axial force F4pre calculated by the virtual rack-end axial force calculating unit 103 by the gain G1 which is set according to the distribution proportion DRf of the estimated axial force F2, and the gain G1 is set to be less as the value of the distribution proportion DRf of the estimated axial force F2 becomes greater. Accordingly, the limiting axial force F4 becomes less as the value of the distribution proportion DRf of the estimated axial force F2 becomes greater. Accordingly, since the value of the limiting axial force F4 which is added to the mixed axial force F3 decreases according to the distribution proportion DRf of the estimated axial force F2, calculation of the final axial force F5 with an excessive value, that is, application of a greater steering reaction force than necessary to a driver, is curbed.

Advantages of First Embodiment

Accordingly, according to the first embodiment, the following advantages can be achieved. The value of the limiting axial force F4 which is added to the mixed axial force F3 decreases according to the value of the distribution proportion DRf of the estimated axial force F2. Accordingly, it is possible to prevent the final axial force F5 from becoming excessive. As a result, it is possible to curb an uncomfortable feeling which is given to a driver due to application of an excessive steering reaction force to the driver.

Particularly, the first embodiment is more effective when the proportion of the estimated axial force F2 in the mixed axial force F3 is greater and when the estimated axial force F2 has a greater value. That is, when the vehicle turns greatly at a low speed, a situation in which the limiting axial force F4 is calculated and a situation in which the estimated axial force F2 becomes dominant due to an increase of the proportion of the estimated axial force F2 in the mixed axial force F3 match each other. Accordingly, when a configuration for adding the limiting axial force F4 to the mixed axial force F3 is employed by the axial force calculating unit 72, the limiting axial force F4 is added to the mixed axial force F3 with a greater value and thus the value of the final axial force F5 is likely to increase excessively. On the other hand, in the first embodiment, since the value of the limiting axial force F4 which is added to the mixed axial force F3 decreases according to the distribution proportion DRf of the estimated axial force F2, it is possible to prevent the final axial force F5 from having an excessive value.

Second Embodiment

A second embodiment in which a steering control device is applied to a steer-by-wire type steering device will be described below. This embodiment basically provides the same configuration as in the first embodiment illustrated in FIGS. 1 to 3. This embodiment is different from the first embodiment in the configuration of the limiting axial force calculating unit in the axial force calculating unit 72.

Depending on product specifications or the like of the steering device 10 or the control device 50, another situation of the vehicle other than the situation in which the steering wheel 11 has reached the limit position in the virtual operation range may need to be transmitted to a driver using the steering reaction force. For example, a situation in which the turning wheels 16 come into contact with an obstacle such as a curbstone when the vehicle starts in a stopped state or the like may be considered as the other situation which needs to be transmitted to a driver.

Therefore, in this embodiment, the following configuration is employed as the axial force calculating unit 72 in order to notify a driver of the other situation of the vehicle using the steering reaction force. As indicated by reference signs in parentheses in FIG. 3, the axial force calculating unit 72 includes a limiting axial force calculating unit 110 instead of the limiting axial force calculating unit 82.

The limiting axial force calculating unit 110 calculates a limiting axial force F6 for limiting additional turning steering or return steering in the situation in which the turning wheels 16 come into contact with an obstacle. The limiting axial force calculating unit 110 calculates the limiting axial force F6 based on the value of the current Ib of the turning motor 41, the target pinion angle θp*, the pinion angle θp, the vehicle speed V, the steering angle θs, and the distribution proportion DRf of the estimated axial force F2.

Figure 5:
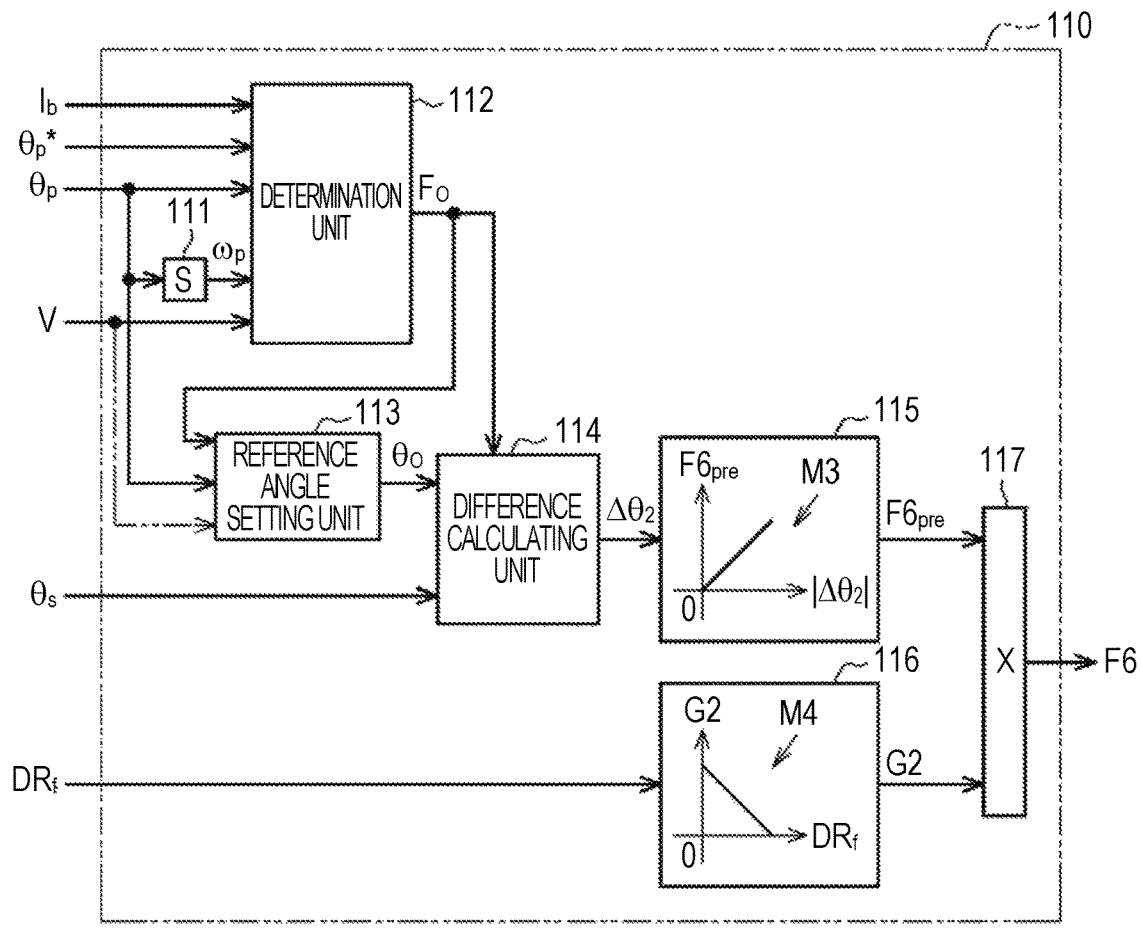
FIG. 5 is a control block diagram illustrating a limiting axial force calculating unit according to a second embodiment.

As illustrated in FIG. 5, the limiting axial force calculating unit 110 includes a differentiator 111, a determination unit 112, a reference angle setting unit 113, a difference calculating unit 114, a curbing axial force calculating unit 115, a gain calculating unit 116, and a multiplier 117.

The differentiator 111 calculates a pinion angular velocity ωp by differentiating the pinion angle θp. The determination unit 112 determines whether the turning wheels 16 are in contact with an obstacle such as a curbstone. The determination unit 112 determines that the turning wheels 16 are in contact with an obstacle such as a curbstone when all of four following determination conditions A1 to A4 are satisfied.

$$|\Delta\theta p(=|\theta p^*-\theta p|)|>\theta pth \qquad (A1)$$

$$|Ib|>Ith \qquad (A2)$$

$$|\omega p|<\omega th \qquad (A3)$$

$$|V|<Vth \qquad (A4)$$

In determination condition A1, "θp*" denotes a target pinion angle which is calculated by the target pinion angle calculating unit 62, and "θp" denotes an actual pinion angle which is calculated by the pinion angle calculating unit 61. "Δθp" denotes an angle difference and is obtained by subtracting the actual pinion angle θp from the target pinion angle θp*. "θth" denotes an angle difference threshold value. The angle difference threshold value θpth is set based on the following view. That is, when the turning wheels 16 are in contact with an obstacle, it is difficult to turn the turning wheels 16 to a turning side or a return side. When the steering wheel 11 is steered to the turning side or the return side in this state, the target pinion angle θp* increases with the steering and the turning angle θw, that is, the pinion angle θp, is maintained at a constant value. Accordingly, when the turning wheels 16 are additionally turned in a state in which the turning wheels 16 are in contact with the obstacle, the value of the difference between the target pinion angle θp* and the pinion angle θp increases. Accordingly, as the absolute value of the angle difference Δθp becomes greater, the likelihood that the turning wheels 16 will be in contact with an obstacle becomes higher. Accordingly, the angle difference Δθp is a value indicating a probability that the turning wheels 16 will be in contact with an obstacle. Base on this regard, the angle difference threshold value θpth is set by experiment or simulation in consideration of tolerance due to noise of the rotational angle sensor 43 or the like.

In determination condition A2, "Ib" denotes the value of the current Ib of the turning motor 41, and "Ith" denotes a current threshold value. The current threshold value Ith is set based on the following view. That is, when the turning wheels 16 are additionally turned in a state in which the turning wheels 16 are in contact with an obstacle, the absolute value of the current Ib of the turning motor 41 increases. Accordingly, as the absolute value of the current Ib of the turning motor 41 becomes greater, the likelihood that the turning wheels 16 are in contact with an obstacle becomes higher. Accordingly, the value of the current Ib of the turning motor 41 is a value indicating the probability that the turning wheels 16 are in contact with an obstacle. Based on this view, the current threshold value Ith is set by experiment or simulation.

In determination condition A3, "$\omega p$" denotes the pinion angular velocity and is obtained by differentiating the pinion angle $\theta p$. "$\omega th$" denotes an angular velocity threshold value. The angular velocity threshold value $\omega th$ is set based on the following view. That is, it is difficult to turn the turning wheels 16 in the state in which the turning wheels 16 are in contact with an obstacle. Accordingly, as the turning speed of the turning wheels 16, that is, the absolute value of the pinion angular velocity $\omega p$, becomes less, the likelihood that the turning wheels 16 are in contact with an obstacle becomes higher. Accordingly, the pinion angular velocity $\omega p$ is a value indicating the probability that the turning wheels 16 are in contact with an obstacle. Based on this view, the angular velocity threshold value $\omega th$ is set by experiment or simulation in consideration of tolerance due to noise of the rotational angle sensor 43 or the like.

In determination condition A4, "V" denotes a vehicle speed. "Vth" denotes a vehicle speed threshold value which serves as a reference for determining whether the vehicle is traveling at a low speed. The vehicle speed threshold value Vth is set based on the vehicle speed V in a low-speed area (equal to or higher than 0 km/h and lower than 40 km/h) and is set to, for example, "40 km/h." The vehicle speed threshold value Vth is set based on the view of determining whether the turning wheels 16 are in contact with an obstacle, that is, whether it is appropriate to notify a driver whether the turning wheels 16 are in contact with an obstacle by rapidly changing the steering reaction force as will be described later.

For example, when the vehicle is traveling at a vehicle speed V in a middle-speed area (equal to or higher than 40 km/h and lower than 60 km/h) or in a high-speed area (equal to or higher than 60 km/h), there may be a situation that a driver has been notified that the turning wheels 16 are in contact with an obstacle, the driver has no margin in feeling, and measures such as an obstacle avoiding operation taken by the driver are not proper or are difficult. In consideration of such a situation, when the vehicle is traveling at a vehicle speed V in the middle-speed area or in the high-speed area, there is short necessity for notifying the driver that the turning wheels 16 are in contact with an obstacle and there is a likelihood that it will be useless to determine whether the turning wheels 16 are in contact with an obstacle. Accordingly, in this embodiment, a condition that the vehicle is traveling at a vehicle speed V in a low-speed area is set as one determination condition for determining whether the turning wheels 16 are in contact with an obstacle.

The determination unit 112 sets a value of a flag Fo based on a result of determination of whether the turning wheels 16 are in contact with an obstacle. When it is determined that the turning wheels 16 are not in contact with an obstacle, that is, when at least one condition of four determination conditions A1 to A4 is not satisfied, the determination unit 112 sets the value of the flag Fo to "0." When it is determined that the turning wheels 16 are in contact with an obstacle, that is, when all of four determination conditions A1 to A4 are satisfied, the determination unit 112 sets the value of the flag Fo to "1."

When the determination unit 112 determines that the turning wheels 16 are in contact with an obstacle, that is, when the value of the flag Fo set by the determination unit 112 is "1," the reference angle setting unit 113 calculates a reference angle $\theta 0$ based on the pinion angle $\theta p$. The reference angle $\theta 0$ is obtained by converting the pinion angle $\theta p$ to a steering angle $\theta s$ based on the steering angle ratio which is a ratio of the turning angle $\theta w$ to the steering angle $\theta s$. In this embodiment, similarly to the first embodiment, the steering angle ratio is "1:1" and the value of the steering angle ratio is "1."

When an element that sets the target pinion angle $\theta p^*$ to a value different from the steering angle $\theta s$ is employed as the target pinion angle calculating unit 62, the reference angle setting unit 113 calculates the reference angle $\theta 0$ by converting the pinion angle $\theta p$ to the steering angle $\theta s$ based on the steering angle ratio and the vehicle speed V as indicated by alternate long and two short dashes lines in FIG. 5. When the determination unit 112 determines that the turning wheels 16 are not in contact with an obstacle, that is, when the value of the flag Fo set by the determination unit 112 is "0," the reference angle setting unit 113 does not calculate the reference angle $\theta 0$.

When the determination unit 112 determines that the turning wheels 16 are in contact with an obstacle, that is, when the value of the flag Fo set by the determination unit 112 is "1," the difference calculating unit 114 calculates an angle difference $\Delta \theta 2$. The angle difference $\Delta \theta 2$ is a difference between the reference angle $\theta 0$ and the steering angle $\theta s$ which is acquired by subtracting the steering angle $\theta s$ calculated by the steering angle calculating unit 51 from the reference angle $\theta 0$ calculated by the reference angle setting unit 113. When the determination unit 112 determines that the turning wheels 16 are not in contact with an obstacle, that is, when the value of the flag Fo set by the determination unit 112 is "0," the difference calculating unit 114 does not calculate the angle difference $\Delta \theta 2$.

The curbing axial force calculating unit 115 calculates a curbing axial force F6pre based on the angle difference $\Delta \theta 2$ which is calculated by the difference calculating unit 114. The curbing axial force calculating unit 115 calculates the curbing axial force F6pre using a limiting axial force map M3 which is stored in the storage unit of the control device 50. The limiting axial force map M3 is a map in which the horizontal axis represents the absolute value of the angle difference $\Delta \theta 2$ which is a difference between the reference angle $\theta 0$ and the steering angle $\theta s$ and the vertical axis represents the curbing axial force F6pre, and defines a relationship between the absolute value of the angle difference $\Delta \theta 2$ and the curbing axial force F6pre. For example, the limiting axial force map M3 has the following characteristics. That is, the curbing axial force F6pre is set to be greater as the absolute value of the angle difference $\Delta \theta 2$ increases from "0." The curbing axial force F6pre is set based on the view that a steering reaction force is generated such that a driver's steering to the side on which the turning wheels are in contact with an obstacle becomes difficult.

The gain calculating unit 116 calculates a gain G2 based on the distribution proportion DRf of the estimated axial force F2 which is calculated by the axial force distribution calculating unit 93. The gain calculating unit 116 calculates the gain G2 using a gain map M4 which is stored in the storage unit of the control device 50. The gain map M4 is a map in which the horizontal axis represents the distribution proportion DRf of the estimated axial force F2 and the vertical axis represents the gain G2, and defines a relationship between the distribution proportion DRf and the gain G2. The gain map M4 has the following characteristics. That is, the value of the gain G2 decreases gradually to "0" as the value of the distribution proportion DRf increases from "0."

The multiplier 117 calculates the limiting axial force F6 by multiplying the curbing axial force F6pre calculated by the curbing axial force calculating unit 115 by the gain G2 calculated by the gain calculating unit 116.

In this embodiment, the gain calculating unit 116 and the multiplier 117 constitutes an axial force adjusting unit that adjusts the value of the limiting axial force F6 based on the estimated axial force F2 which is an axial force that reflects the force applied to the turning shaft 14 when the final axial force F5 reflects the limiting axial force F6. The limiting axial force F6 is an example of a second limiting axial force for virtually limiting the operation of the steering wheel 11 when the turning operation of the turning wheels 16 is limited.

Operations in Second Embodiment

The operations in the second embodiment will be described below. For example, when the steering wheel 11 is steered in a state in which the turning wheels 16 are in contact with an obstacle, the limiting axial force calculating unit 110 calculates the limiting axial force F6. Accordingly, a value obtained by adding the limiting axial force F6 calculated by the limiting axial force calculating unit 110 to the mixed axial force F3 calculated by the mixed axial force calculating unit 81 is set as the final axial force F5. In this case, since the converted torque value T2* obtained by converting the final axial force F5 to at torque is reflected in the steering reaction force command value T*, the steering reaction force increases rapidly. Accordingly, a driver has difficulty operating the steering wheel 11 in a direction in which the absolute value of the steering angle θs increases. Accordingly, the driver can recognize that the turning wheels 16 are in contact with an obstacle such as a curbstone by feeling a feeling of hitting an end as a steering reaction force.

By adding the limiting axial force F6 to the mixed axial force F3, the final axial force F5 with an excessive value may be calculated. Particularly, when the limiting axial force F6 is added in a state in which the distribution proportion DRf of the estimated axial force F2 that occupies the mixed axial force F3 becomes greater, that is, in a state in which the estimated axial force F2 is dominant, the final axial force F5 is likely to have an excessive value.

In this regard, according to the second embodiment, the value of the limiting axial force F6 changes according to the distribution proportion DRf which is a proportion of the estimated axial force F2 that occupies the mixed axial force F3. That is, the limiting axial force F6 is calculated by multiplying the curbing axial force F6pre calculated by the curbing axial force calculating unit 115 by the gain G2 set based on the distribution proportion DRf of the estimated axial force F2, and the gain G2 is set to be less as the value of the distribution proportion DRf of the estimated axial force F2 becomes greater. Accordingly, as the distribution proportion DRf of the estimated axial force F2 becomes greater, the value of the limiting axial force F6 becomes less. Accordingly, since the value of the limiting axial force F6 which is added to the mixed axial force F3 decreases according to the distribution proportion DRf of the estimated axial force F2, calculation of the final axial force F5 with an excessive value, that is, application of a greater steering reaction force than necessary to a driver, is curbed.

Advantages of Second Embodiment

Accordingly, according to the second embodiment, the following advantages can be achieved. (2) When the steering wheel 11 is operated in a state in which the turning wheels 16 come into contact with an obstacle, the value of the limiting axial force F6 which is added to the mixed axial force F3 decreases according to the value of the distribution proportion DRf of the estimated axial force F2. Accordingly, it is possible to prevent the final axial force F5 from becoming excessive. As a result, it is possible to curb an uncomfortable feeling which is given to a driver due to application of an excessive steering reaction force to the driver.

Third Embodiment

A third embodiment in which a steering control device is applied to a steer-by-wire type steering device will be described below. This embodiment basically provides the same configuration as in the first embodiment illustrated in FIGS. 1 to 3. This embodiment is different from the first embodiment in the configuration of the limiting axial force calculating unit in the axial force calculating unit 72.

Depending on product specifications or the like of the steering device 10 or the control device 50, another situation of the vehicle other than the situation in which the steering wheel 11 has reached the limit position in the virtual operation range may need to be transmitted to a driver using the steering reaction force. For example, as the other situation which needs to be transmitted to a driver, a situation in which the turning angle θw of the turning wheels 16, that is, the pinion angle θp, cannot reach the target value thereof because the current supplied to the turning motor 41 due to shortage of electric power in a battery which is mounted in the vehicle, that is, the torque generated from the turning motor 41, is limited to a value less than a torque which is to be inherently generated and is insufficient may be considered.

Therefore, in this embodiment, the following configuration is employed as the axial force calculating unit 72 in order to notify a driver of the other situation of the vehicle using the steering reaction force. As indicated by reference signs in parentheses in FIG. 3, the axial force calculating unit 72 includes a limiting axial force calculating unit 120 instead of the limiting axial force calculating unit 82.

The limiting axial force calculating unit 120 calculates a limiting axial force F7 for limiting additional turning steering or return steering in the state in which the current supplied to the turning motor 41, that is, the torque generated from the turning motor 41, is limited to a value less than a torque which is to be inherently generated. The limiting axial force calculating unit 120 calculates the limiting axial force F7 based on the target pinion angle θp*, the pinion angle θp, a limit value Ilim of a current supplied to the turning motor 41, and the distribution proportion DRf of the estimated axial force F2.

The limit value Ilim is calculated by a limit value calculating unit 130 which is provided in the control device 50. The limit value calculating unit 130 calculates a limit value Ilim with a value less than a rated current value of the turning motor 41 when a voltage Vb of an onboard battery reaches a value equal to or less than a voltage threshold value. The limit value calculating unit 130 calculates the limit value Ilim with a smaller absolute value with a decrease of the voltage Vb.

The limit value Ilim may be supplied to the power supply control unit 64 of the turning control unit 50b as well as the limiting axial force calculating unit 120. When the limit value Ilim is calculated by the limit value calculating unit 130, the power supply control unit 64 compares the absolute value of the current which is to be supplied to the turning motor 41 with the limit value Ilim. When the absolute value of the current which is to be supplied to the turning motor 41 is greater than the limit value Ilim, the power supply control unit 64 limits the absolute value of the current which is to be supplied to the turning motor 41 to the limit value Ilim. Accordingly, a torque which is generated from the turning motor 41 is limited to a torque corresponding to the limit value Ilim. When the absolute value of the current which is to be supplied to the turning motor 41 is equal to or less than the limit value Ilim, the power supply control unit 64 supplies the original current which is calculated through feedback control of the current Ib to the turning motor 41 without change. Since the torque of the turning motor 41 is not limited, the turning motor 41 generates the torque which is to be inherently generated.

Figure 6:
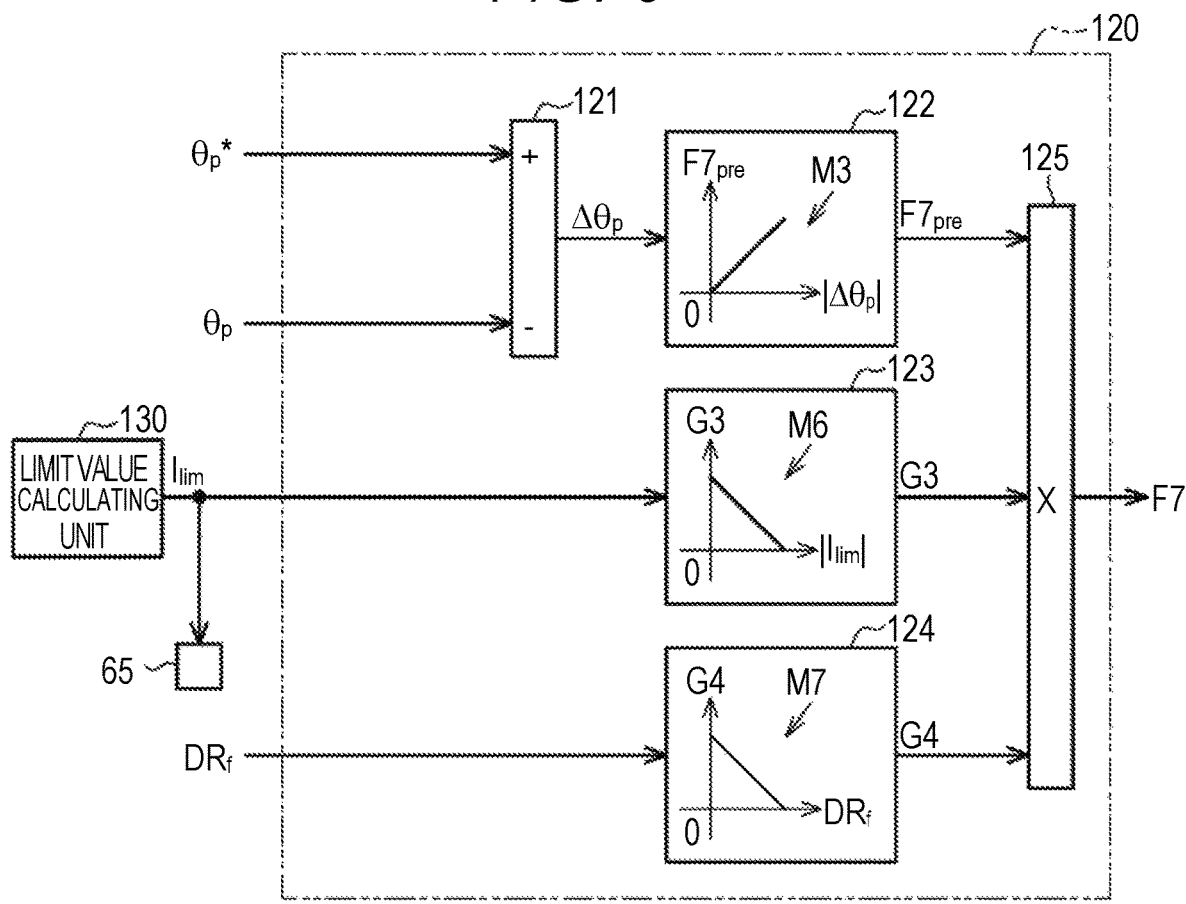
FIG. 6 is a control block diagram illustrating a limiting axial force calculating unit according to a third embodiment.

As illustrated in FIG. 6, the limiting axial force calculating unit 120 includes a subtractor 121, a current-limiting axial force calculating unit 122, two gain calculating units 123 and 124, and a multiplier 125. The subtractor 121 calculates an angle difference $\Delta\theta p$ by subtracting the pinion angle $\theta p$ from the target pinion angle $\theta p^*$.

The current-limiting axial force calculating unit 122 calculates a current-limiting axial force F7pre based on the angle difference $\Delta\theta p$ which is calculated by the subtractor 121. The current-limiting axial force calculating unit 122 calculates the current-limiting axial force F7pre using a limiting axial force map M5 which is stored in the storage unit of the control device 50. The limiting axial force map M5 is a map in which the horizontal axis represents the absolute value of the angle difference $\Delta\theta p$ which is the difference between the target pinion angle $\theta p^*$ and the pinion angle $\theta p$ and the vertical axis represents the current-limiting axial force F7pre, and defines a relationship between the absolute value of the angle difference $\Delta\theta p$ and the current-limiting axial force F7pre. The limiting axial force map M5 has, for example, the following characteristics. That is, the current-limiting axial force F7pre is set to be greater as the absolute value of the angle difference $\Delta\theta p$ increases from "0." The current-limiting axial force F7pre is set based on the view of generating a steering reaction force corresponding to a degree of limiting of the current which is supplied to the turning motor 41, that is, the torque which is generated from the turning motor 41.

The angle difference $\Delta\theta p$ is a value indicating the probability that the current which is supplied to the turning motor 41 is limited. That is, since the turning wheels 16 cannot be sufficiently turned in the situation in which the current which is supplied to the turning motor 41 is limited, the difference between the target pinion angle $\theta p^*$ and the pinion angle $\theta p$ increases as the turning wheels 16 are to be more turned. Accordingly, as the absolute value of the angle difference $\Delta\theta p$ becomes greater, the likelihood that the current which is supplied to the turning motor 41 is limited becomes higher.

The gain calculating unit 123 calculates a gain G3 based on a limit value Ilim which is calculated by the limit value calculating unit 130. The limit value Ilim is a limit value of the current which is supplied to the turning motor 41. The gain calculating unit 123 calculates the gain G3 using a gain map M6 which is stored in the storage unit of the control device 50. The gain map M6 is a map in which the horizontal axis represents the absolute value of the limit value Ilim and the vertical axis represents the gain G3, and defines a relationship between the absolute value of the limit value Ilim and the gain G3. The gain map M6 has the following characteristics. That is, the value of the gain G3 decreases gradually to "0" as the absolute value of the limit value Ilim increases. The limit value Ilim is, for example, a value in a range of "1" to "0."

The gain G3 is also a value indicating the probability that the current which is supplied to the turning motor 41 is limited. That is, as the absolute value of the current which is supplied to the turning motor 41 is limited to a less value, the absolute value of the limit value Ilim is set to be less. Accordingly, as the absolute value of the limit value Ilim becomes less, the probability that the absolute value of the current which is supplied to the turning motor 41 is limited to a less value becomes higher.

The gain calculating unit 124 calculates a gain G4 according to the distribution proportion DRf of the estimated axial force F2 calculated by the axial force distribution calculating unit 93. The gain calculating unit 116 calculates the gain G4 using a gain map M7 which is stored in the storage unit of the control device 50. The gain map M7 is a map in which the horizontal axis represents the distribution proportion DRf of the estimated axial force F2 and the vertical axis represents the gain G4, and defines a relationship between the distribution proportion DRf and the gain G4. The gain map M7 has the following characteristics. That is, the value of the gain G4 decreases gradually to "0" as the value of the distribution proportion DRf increases from "0."

The multiplier 125 calculates the limiting axial force F7 by multiplying the current-limiting axial force F7pre calculated by the current-limiting axial force calculating unit 122 by the gain G3 calculated by the gain calculating unit 123 and the gain G4 calculated by the gain calculating unit 124.

In this embodiment, the gain calculating unit 124 and the multiplier 125 constitute an axial force adjusting unit that adjusts the value of the limiting axial force F7 according to the estimated axial force F2 which is an axial force that reflects the force applied to the turning shaft 14 when the final axial force F5 reflects the limiting axial force F7. The limiting axial force F7 is an example of a third limiting axial force for virtually limiting the operation of the steering wheel 11 when the torque from the turning motor 41 is limited to a value less than the torque which is to be inherently generated.

Operations in Third Embodiment

The operations in the third embodiment will be described below. For example, when the current which is supplied to the turning motor 41 is limited, the limiting axial force calculating unit 120 calculates the limiting axial force F7. Accordingly, a value obtained by adding the limiting axial force F7 calculated by the limiting axial force calculating unit 120 to the mixed axial force F3 calculated by the mixed axial force calculating unit 81 is set as the final axial force F5. In this case, since the converted torque value T2* obtained by converting the final axial force F5 to a torque is reflected in the steering reaction force command value T*, the steering reaction force increases rapidly. Accordingly, a driver has difficulty operating the steering wheel 11 in a direction in which the absolute value of the steering angle $\theta s$ increases. Accordingly, the driver can recognize that the current which is supplied to the turning motor 41, that is, the torque which is generated from the turning motor 41, is limited by feeling a feeling of hitting an end as the steering reaction force.

By adding the limiting axial force F7 to the mixed axial force F3, the final axial force F5 may be calculated to have an excessive value. Particularly, when the limiting axial force F7 is added in a state in which the distribution proportion DRf of the estimated axial force F2 that occupies the mixed axial force F3 becomes greater, that is, in a state in which the estimated axial force F2 is dominant, the final axial force F5 is likely to have an excessive value.

In this regard, according to the third embodiment, the value of the limiting axial force F7 changes according to the distribution proportion DRf which is a proportion of the estimated axial force F2 that occupies the mixed axial force F3. That is, the limiting axial force F7 is calculated by multiplying the current-limiting axial force F7pre calculated by the current-limiting axial force calculating unit 122 by the gain G3 based on the limit value Ilim and the gain G4 based on the distribution proportion DRf, and the gain G4 is set to be less as the value of the distribution proportion DRf of the estimated axial force F2 becomes greater. Accordingly, as the value of the distribution proportion DRf of the estimated axial force F2 becomes greater, the value of the limiting axial force F7 becomes less. Accordingly, since the value of the limiting axial force F7 which is added to the mixed axial force F3 decreases according to the distribution proportion DRf of the estimated axial force F2, calculation of the final axial force F5 with an excessive value, that is, application of a greater steering reaction force than necessary to a driver, is curbed.

Advantages of Third Embodiment

Accordingly, according to the third embodiment, the following advantages can be achieved. When the current which is supplied to the turning motor 41 is limited, the value of the limiting axial force F7 which is added to the mixed axial force F3 decreases according to the value of the distribution proportion DRf of the estimated axial force F2. Accordingly, it is possible to prevent the value of the final axial force F5 from becoming excessive. As a result, it is possible to curb an uncomfortable feeling which is given to a driver due to application of an excessive steering reaction force to the driver.

Fourth Embodiment

A fourth embodiment in which a steering control device is applied to a steer-by-wire type steering device will be described below. This embodiment basically provides the same configuration as in the first embodiment illustrated in FIGS. 1 to 4. This embodiment is different from the first embodiment in the configuration of the mixed axial force calculating unit 81. In addition, this embodiment may be applied to the second or third embodiment described above.

Figure 7:
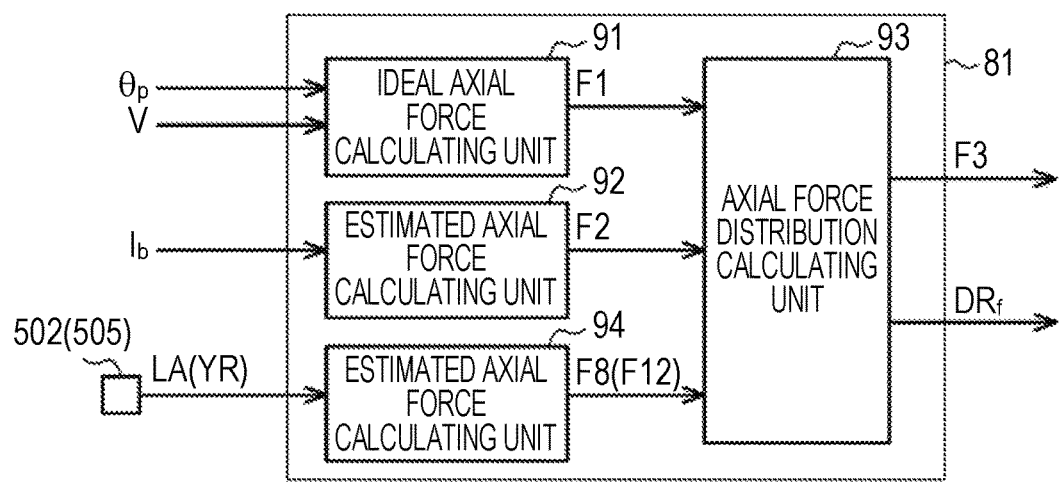
FIG. 7 is a control block diagram illustrating a mixed axial force calculating unit according to a fourth embodiment.

As illustrated in FIG. 7, the mixed axial force calculating unit 81 includes an estimated axial force calculating unit 94 in addition to the ideal axial force calculating unit 91, the estimated axial force calculating unit 92, and the axial force distribution calculating unit 93. The estimated axial force calculating unit 94 calculates an estimated axial force F8 acting on the turning shaft 14 based on a lateral acceleration LA which is detected by a lateral acceleration sensor 502 provided in the vehicle. The estimated axial force F8 is calculated by multiplying a gain which is a coefficient based on the vehicle speed V by the lateral acceleration LA. A road-surface state or vehicle behavior is reflected in the lateral acceleration LA. Accordingly, the road-surface state or the vehicle behavior is reflected in the estimated axial force F8 which is calculated based on the lateral acceleration LA.

The axial force distribution calculating unit 93 receives an ideal axial force F1 and estimated axial forces F2 and F8.

Then, the axial force distribution calculating unit 93 individually sets distribution proportions for the ideal axial force F1 and the estimated axial forces F2 and F8 based on various state parameters that reflect the vehicle behavior, the road-surface state, or the steered state. The axial force distribution calculating unit 93 calculates the mixed axial force F3 by summing values obtained by multiplying the ideal axial force F1 and the estimated axial forces F2 and F8 by the distribution proportions which are individually set. The axial force distribution calculating unit 93 supplies the distribution proportion DRf of the estimated axial force F2 to the limiting axial force calculating unit 82.

The ideal axial force F1 based on the pinion angle θp and the estimated axial forces F2 and F8 based on the lateral acceleration LA are axial forces that do not reflect a force of a high load when the force of a high load is applied to the turning shaft 14. The estimated axial force F2 based on the current Ib of the turning motor 41 is an axial force that reflects a force of a high load when the force of a high load is applied to the turning shaft 14. As a situation in which a force of a high load is applied to the turning shaft 14, for example, a situation in which an end contact in which an end of the turning shaft 14 comes into contact with a housing which is not illustrated occurs or a situation in which the turning wheels 16 come into contact with an obstacle such as a curbstone may be considered.

Operations in Fourth Embodiment

The operations in the fourth embodiment will be described below. The ideal axial force F1 based on the pinion angle θp, the estimated axial force F2 based on a state parameter (Ib) that reflects the road-surface state, and the estimated axial force F8 based on a state parameter (LA) that reflects the road-surface state or the vehicle behavior are summed at predetermined distribution proportions. Accordingly, the mixed axial force F3 that more finely reflects the road-surface state or the vehicle behavior is calculated. Since the mixed axial force F3 is reflected in the steering reaction force command value T*, a smaller steering reaction force based on the road-surface state, the vehicle behavior, or the steered state is applied to the steering wheel 11.

After the steering wheel 11 has reached the limit position of the virtual operation range, the limiting axial force F4 for limiting the operation of the steering wheel 11 increases rapidly. Since the limiting axial force F4 is added to the mixed axial force F3, there is concern that the final axial force F5 with an excessive value will be calculated.

For example, when the turning wheels 16 are in contact with an obstacle such as a curbstone in a state in which the operation position of the steering wheel 11 reaches the vicinity of the limit position of the virtual operation range, the estimated axial force F2 based on the current Ib of the turning motor 41 has a greater value. This is because the estimated axial force F2 reflects a force applied to the turning shaft 14. From the view of transmitting a road-surface state or a turned state of the turning wheels 16 to a driver using a steering reaction force, the proportion of the estimated axial force F2 in the mixed axial force F3 increases. That is, since the limiting axial force F4 is added to the mixed axial force F3 with a greater value, the value of the final axial force F5 is likely to become excessive.

In this regard, according to the fourth embodiment, the value of the limiting axial force F4 changes according to the distribution proportion DRf of the estimated axial force F2, that is, the proportion of the estimated axial force F2 in the mixed axial force F3. That is, the limiting axial force F4 is calculated by multiplying the virtual rack-end axial force F4pre calculated by the virtual rack-end axial force calculating unit 103 by the gain G1 based on the distribution proportion DRf, and the gain G1 is set to be less as the value of the distribution proportion DRf becomes greater. Accordingly, the limiting axial force F4 becomes less as the value of the distribution proportion DRf becomes greater. Accordingly, since the value of the limiting axial force F4 which is added to the mixed axial force F3 decreases according to the distribution proportion DRf, calculation of the final axial force F5 with an excessive value, that is, application of a greater steering reaction force than necessary to a driver, is curbed.

Advantages of Fourth Embodiment

Accordingly, according to the fourth embodiment, the following advantages can be achieved. When the limiting axial force F4 is calculated, the value of the limiting axial force F4 decreases according to the value of the distribution proportion DRf of the estimated axial force F2. Since the value of the limiting axial force F4 which is added to the mixed axial force F3 decreases, it is possible to prevent the final axial force F5 from becoming excessive. As a result, it is possible to curb an uncomfortable feeling which is given to a driver due to application of an excessive steering reaction force to the driver.

Fifth Embodiment

A fifth embodiment in which a steering control device is applied to a steer-by-wire type steering device will be described below. This embodiment basically provides the same configuration as in the first embodiment illustrated in FIGS. 1 to 4. This embodiment is different from the first embodiment in the configuration of the axial force calculating unit 72. In addition, this embodiment may be applied to the second to fourth embodiments described above.

Figure 8A:
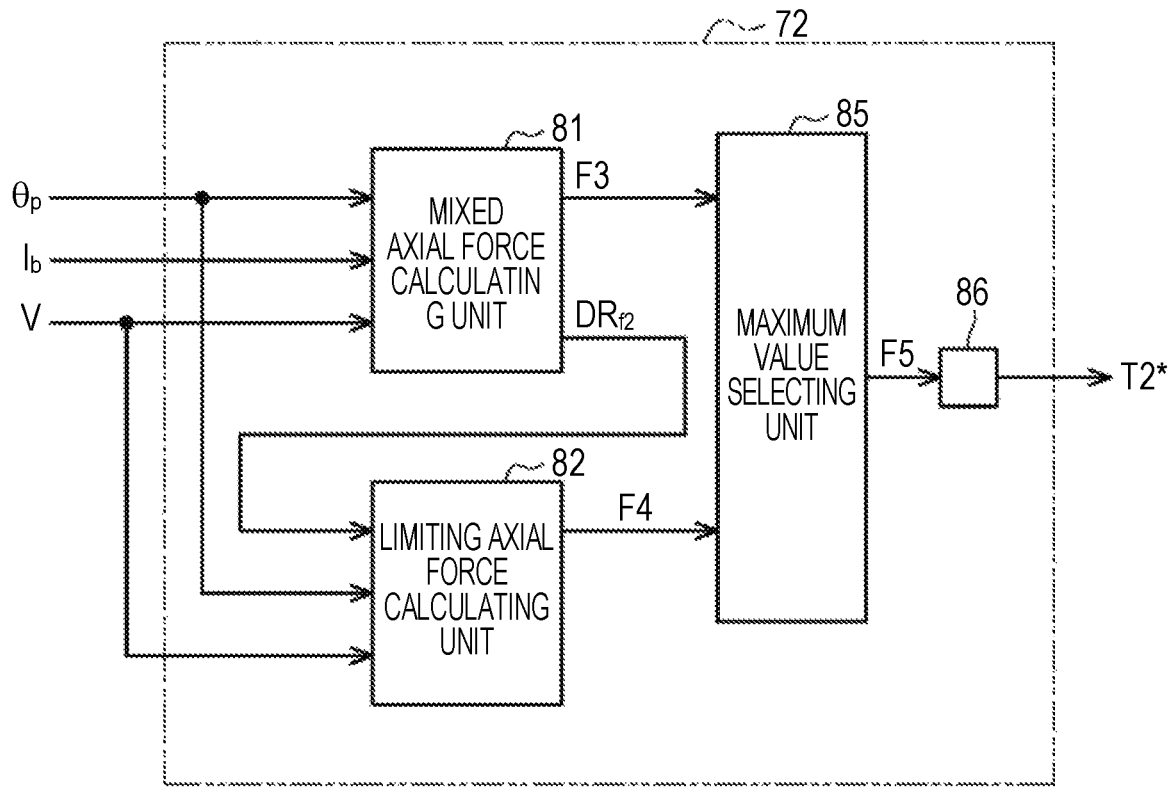
FIG. 8A is a control block diagram illustrating an axial force calculating unit according to a fifth embodiment.

As illustrated in FIG. 8A, the axial force calculating unit 72 includes a maximum value selecting unit 85 instead of the adder 83 illustrated in FIG. 3. The maximum value selecting unit 85 receives a mixed axial force F3 which is calculated by the mixed axial force calculating unit 81 and a limiting axial force F4 which is calculated by the limiting axial force calculating unit 82. The maximum value selecting unit 85 selects one with a greater absolute value of the mixed axial force F3 and the limiting axial force F4, and sets the selected mixed axial force F3 or limiting axial force F4 as a final axial force F5 which is used to calculate a steering reaction force command value T*.

When this configuration is employed, the axial force with a greater absolute value of the mixed axial force F3 and the limiting axial force F4 is set as the final axial force F5 which is used to calculate the steering reaction force command value T*. Since the limiting axial force F4 is not added to the mixed axial force F3, it is possible to prevent the value of the final axial force F5 from becoming excessive. Accordingly, it is possible to curb an uncomfortable feeling which is given to a driver due to application of an excessive steering reaction force to the driver.

However, although an appropriate limiting axial force F4 for virtually limiting the operation range of the steering wheel 11 is calculated by the limiting axial force calculating unit 82, there is concern that the limiting axial force F4 may not be used. An example thereof is a case in which the mixed axial force F3 is greater than the limiting axial force F4.

Therefore, in this embodiment, the limiting axial force calculating unit 82 employs the following configuration.

Figure 8B:
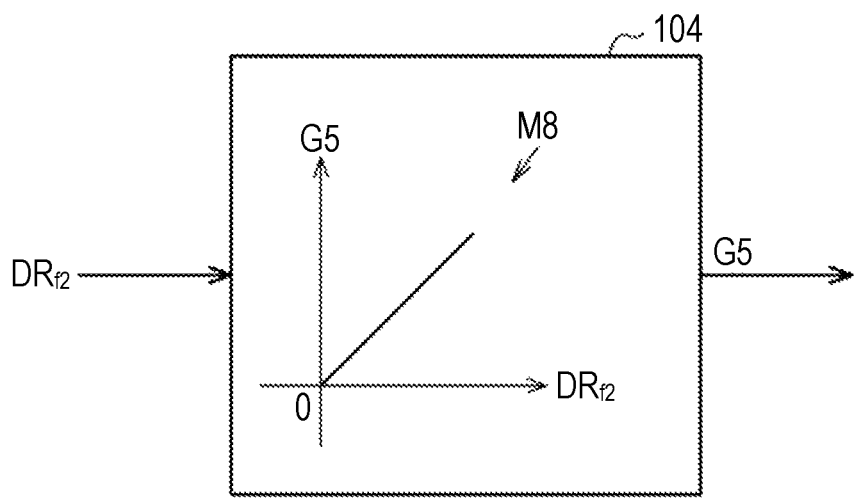
FIG. 8B is a control block diagram illustrating a gain calculating unit according to the fifth embodiment.

That is, the limiting axial force calculating unit 82 receives a distribution proportion DRf2 of an ideal axial force F1 which is an axial force that does not reflect a force applied to the turning shaft 14 instead of the distribution proportion DRf of the estimated axial force F2. As illustrated in FIG. 8B, the gain calculating unit 104 calculates a gain G5 using a gain map M8 having characteristics opposite to the gain map M2 illustrated in FIG. 4. The gain map M8 has the following characteristics. That is, value of the gain G5 sets to be greater as the value of the distribution proportion DRf2 increases from "0." The multiplier 105 illustrated in FIG. 4 calculates the limiting axial force F4 by multiplying the virtual rack-end axial force F4pre calculated by the virtual rack-end axial force calculating unit 103 by the gain G5.

In this embodiment, the maximum value selecting unit 85 is an example of a final axial force calculating unit that calculates the final axial force F5 which is a final axial force reflected in the steering reaction force command value T*.

Operations and Advantages in Fifth Embodiment

Accordingly, according to the fifth embodiment, the following operations and advantages can be achieved.

As the distribution proportion DRf2 of the ideal axial force F1 becomes greater, the value of the limiting axial force F4 calculated by the limiting axial force calculating unit 82 becomes greater. Accordingly, when the operation position of the steering wheel 11 approaches the limit position of the virtual operation range and the limiting axial force F4 is calculated by the limiting axial force calculating unit 82, the limiting axial force F4 is likely to have a value greater than the mixed axial force F3. Accordingly, the maximum value selecting unit 85 is likely to set the limiting axial force F4 for virtually limiting the operation range of the steering wheel 11 as the final axial force F5 which is used to calculate the steering reaction force command value T*. As a result, a driver can recognize that the steering wheel 11 has reached the limit position of the virtual operation range by feeling a more appropriate steering reaction force as a response.

Sixth Embodiment

A sixth embodiment in which a steering control device is applied to an electric power steering device (EPS) will be described below. The same elements as in the first embodiment will be referred by the same reference signs and detailed description thereof will be omitted.

In the EPS, the steering wheel 11 and the turning wheels 16 illustrated in FIG. 1 are mechanically connected to each other. That is, the steering shaft 12, the pinion shaft 13, and the turning shaft 14 serve as a power transmission path between the steering wheel 11 and the turning wheels 16. By allowing the turning shaft 14 to move linearly with a rotational operation of the steering wheel 11, the turning angle θw of the turning wheels 16 changes. The EPS includes an assist motor that is provided at the same position as the turning motor 41 illustrated in FIG. 1. The assist motor generates a steering assist force which is a torque in the same direction as the steering direction.

Figure 9:
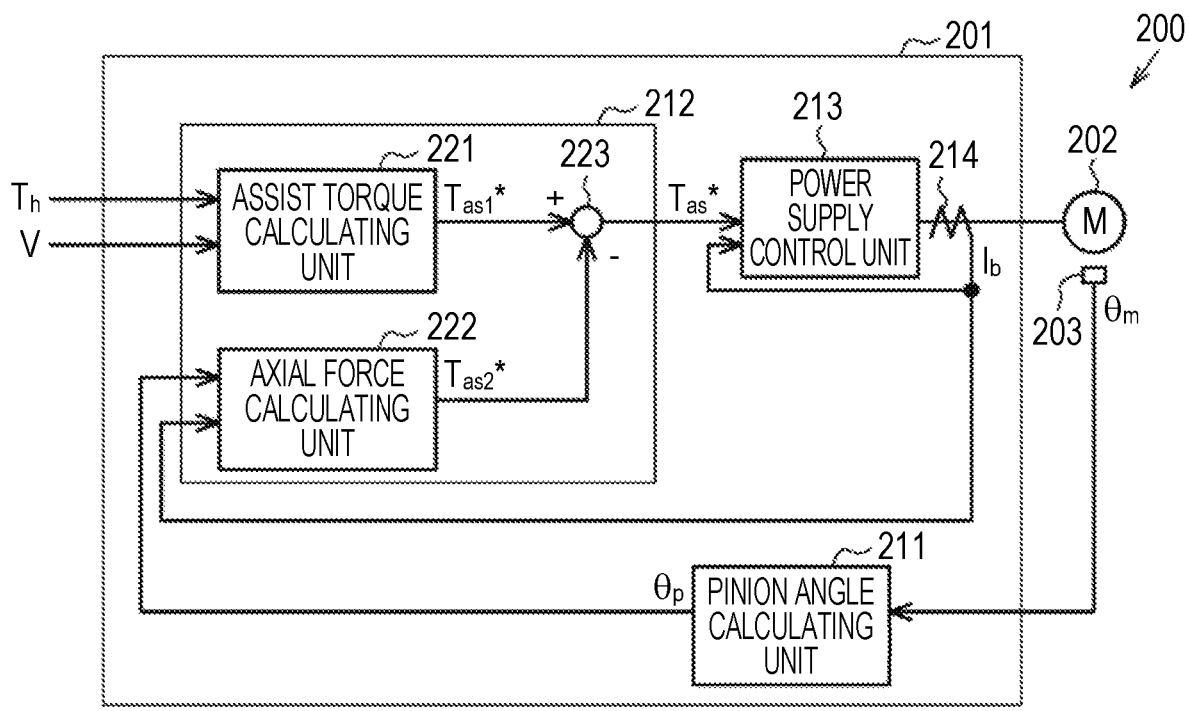
FIG. 9 is a control block diagram of a steering control device according to a sixth embodiment which is applied to an electric power steering device.

As illustrated in FIG. 9, a control device 201 of an EPS 200 performs assist control for generating a steering assist force based on the steering torque Th by controlling supply of electric power to an assist motor 202. The control device 201 controls supply of electric power to the assist motor 202 based on a steering torque Th which is detected by the torque sensor 34, a vehicle speed V which is detected by the vehicle speed sensor 501, and a rotational angle θm detected by a rotational angle sensor 203 that is provided in the assist motor 202.

The control device 201 includes a pinion angle calculating unit 211, an assist command value calculating unit 212, and a power supply control unit 213. The pinion angle calculating unit 211 receives the rotational angle θm of the assist motor 202 and calculates a pinion angle θp which is a rotational angle of the pinion shaft 44 based on the received rotational angle θm. The assist command value calculating unit 212 calculates an assist command value Tas* based on the steering torque Th and the vehicle speed V. The assist command value Tas* is a value corresponding to a torque which is to be generated from the assist motor 202. The power supply control unit 213 supplies electric power based on the assist command value Tas* to the assist motor 202. A current sensor 214 is provided in a power supply path to the assist motor 202. The current sensor 214 detects an actual value of a current Im which is supplied to the assist motor 202.

The configuration of the assist command value calculating unit 212 will be described below in detail. The assist command value calculating unit 212 includes an assist torque calculating unit 221, an axial force calculating unit 222, and a subtractor 223.

The assist torque calculating unit 221 calculates an assist torque Tas1* based on the steering torque Th and the vehicle speed V. The assist torque calculating unit 221 calculates the assist torque Tas1* such that the absolute value thereof becomes greater as the absolute value of the steering torque Th becomes greater and as the vehicle speed V becomes lower.

The axial force calculating unit 222 has the same calculation function as the axial force calculating unit 72 illustrated in FIG. 3. The axial force calculating unit 222 calculates a final axial force F5 which is applied to the turning shaft 14 based on the value of the current Im of the assist motor 202 detected by the current sensor 214, the pinion angle θp calculated by the pinion angle calculating unit 211, and the vehicle speed V detected by the vehicle speed sensor 501, and calculates a converted torque value Tas2* by converting the final axial force F5 to a torque.

The subtractor 223 calculates the assist command value Tas* by subtracting the converted torque value Tas2* calculated by the axial force calculating unit 222 from the assist torque Tas1* calculated by the assist torque calculating unit 221.

The control device 201 of the EPS may also have a function of performing first control for virtually limiting the operation range of the steering wheel 11, second control for limiting steering in a state in which the turning wheels 16 are in contact with an obstacle, or third control for limiting steering in a state in which a current supplied to the turning motor 41 is limited. In this case, when at least one of the first to third control is performed, there is concern that an excessive steering assist force will be applied to the steering wheel 11.

Therefore, the axial force calculating unit 222 in this embodiment has the same calculation function as one of the limiting axial force calculating units 82, 110, and 120 illustrated in FIGS. 4 to 6. That is, when the control device 201 has a function of performing the first control, the same configuration as the limiting axial force calculating unit 82 illustrated in FIG. 4 is employed as the axial force calculating unit 222. When the control device 201 has a function of performing the second control, the same configuration as the limiting axial force calculating unit 110 illustrated in FIG. 5 is employed as the axial force calculating unit 222. When the control device 201 has a function of performing the third control, the same configuration as the limiting axial force calculating unit 120 illustrated in FIG. 6 is employed as the axial force calculating unit 222.

The same configuration as the mixed axial force calculating unit 81 in the fourth embodiment illustrated in FIG. 7 may be employed as the mixed axial force calculating unit of the axial force calculating unit 222. The same configuration as the axial force calculating unit 72 in the fifth embodiment illustrated in FIG. 9 may be employed as the axial force calculating unit 222.

Advantages of Sixth Embodiment

Accordingly, according to the sixth embodiment, the following advantages can be achieved. For example, when the limiting axial forces F4, F6, and F7 are calculated, the values of the limiting axial forces F4, F6, and F7 decrease according to the value of the distribution proportion DRf of the estimated axial force F2 that reflects the force applied to the turning shaft 14 via the turning wheels 16. Since the values of the limiting axial forces F4, F6, and F7 which are added to the mixed axial force F3 decrease, it is possible to prevent the value of the final axial force F5 from becoming excessive. Accordingly, it is possible to curb an uncomfortable feeling which is given to a driver due to application of an excessive steering assist force to the driver.

OTHER EMBODIMENTS

The above embodiments may be modified as follows.

In the fourth embodiment, as indicated by reference signs in parentheses in FIG. 7, the estimated axial force calculating unit 94 may calculate an estimated axial force F12 which is applied to the turning shaft 14 based on a yaw rate YR which is detected by a yaw rate sensor 505 which is provided in the vehicle instead of the lateral acceleration LA or in addition to the lateral acceleration LA. The estimated axial force F12 is calculated by multiplying a yaw rate differential value which is a value obtained by differentiating the yaw rate YR by a vehicle speed gain which is a coefficient based on the vehicle speed V. The vehicle speed gain is set to be greater as the vehicle speed V becomes higher. The yaw rate YR reflects a road-surface state such as a road-surface frictional resistance or vehicle behavior. Accordingly, the estimated axial force F12 which is calculated based on the yaw rate YR reflects the actual road-surface state or vehicle behavior.

In the fourth embodiment, the mixed axial force calculating unit 81 may include one or two or more estimated axial force calculating units that calculate an axial force that reflects a force with a high load applied to the turning shaft 14 in addition to the estimated axial force calculating unit 92. The other estimated axial force calculating unit calculates another estimated axial force applied to the turning shaft 14 based on a road-surface state or a state parameter that reflects the force applied to the turning shaft 14 other than the current Ib which is supplied to the turning motor 41. The axial force distribution calculating unit 93 calculates a distribution proportion DRf by summing the distribution proportions of the estimated axial force F2 and the other estimated axial force and supplies the distribution proportion DRf as the calculated total sum to the limiting axial force calculating unit 82. Accordingly, when the limiting axial force F4 is calculated, the value of the limiting axial force F4 decreases according to the distribution proportion DRf as the total sum. Since the value of the limiting axial force F4 which is added to the mixed axial force F3 decreases, it is possible to prevent the value of the final axial force F5 from becoming excessive.

In the first to sixth embodiments, the ideal axial force calculating unit 91 may not necessarily consider the vehicle speed V at the time of calculating the ideal axial force F1. In the first to fifth embodiments, the target steering reaction force calculating unit 71 may calculate the target steering reaction force T1* based on only the steering torque Th. In the sixth embodiment, the assist torque calculating unit 221 may calculate the assist torque Tas1* based on only the steering torque Th.

In the first to fifth embodiments, the following configuration may be employed as the steering reaction force command value calculating unit 52. That is, the steering reaction force command value calculating unit 52 calculates the target steering torque based on the steering torque Th and calculates a first steering reaction force command value by feedback control of the steering torque Th such that the detected value of the steering torque Th can reach the target steering torque. The steering reaction force command value calculating unit 52 calculates the final axial force F5 based on the pinion angle θp, the value of the current Ib of the turning motor 41, and the vehicle speed V similarly to the first to fifth embodiments. The steering reaction force command value calculating unit 52 calculates a target steering angle based on the steering torque Th, the first steering reaction force command value, the final axial force F5, and the vehicle speed V and calculates a second steering reaction force command value by feedback control of the steering angle θs such that the steering angle θs can reach the target steering angle. The steering reaction force command value calculating unit 52 calculates the steering reaction force command value T* by summing the first steering reaction force command value and the second steering reaction force command value.

In the first to fifth embodiments, a clutch may be provided in the steering device 10. In this case, as indicated by an alternate long and two short dashes line in FIG. 2, the steering shaft 12 and the pinion shaft 13 are connected via a clutch 21. An electromagnetic clutch that intermits supply of power by intermitting supply of electric power to an excitation coil is employed as the clutch 21. The control device 50 performs engagement/disengagement control for switching the clutch 21 between an engaged state and a disengaged state. When the clutch 21 is disengaged, transmission of power between the steering wheel 11 and the turning wheels 16 is mechanically cut off. When the clutch 21 is engaged, transmission of power between the steering wheel 11 and the turning wheels 16 is mechanically permitted.

In the first to fourth embodiments, the following configuration may be employed as the limiting axial force calculating units 82, 110, and 120. That is, as a value of a distribution proportion DRf 2 of the axial force (F1, F8) that does not reflect the force applied to the turning shaft 14 or a value of a distribution proportion DRf2 which is a total sum of distribution proportions which are individually set for a plurality of axial forces that do not reflect the force applied to the turning shaft 14 increases, the values of the limiting axial forces F4, F6, and F7 are increased. In this case, the characteristics of the gain maps M2, M4, and M7 illustrated in FIGS. 4 to 6 are set as follows with the horizontal axis set as the distribution proportion DRf2. That is, the gains G1, G2, and G4 are set to be greater as the value of the distribution proportion DRf2 increases from "0." Accordingly, since the proportions of the limiting axial forces F4, F6, and F7 in the final axial force F5 increase, it is possible to more appropriately limit the operation of the steering wheel 11.

In the first to fourth embodiments and the other embodiments, the following configuration may be employed as the limiting axial force calculating units 82, 110, and 120. That is, when the distribution proportion DRf of the axial force (F2) that reflects the force applied to the turning shaft 14 is less than the distribution proportion DRf2 of the axial force (F1, F8) that does not reflect the force applied to the turning shaft 14, the values of the limiting axial forces F4, F6, and F7 are increased as the value of the distribution proportion DRf increases. The same is true when the distribution proportion DRf which is a total sum of distribution proportions which are individually set for one or two or more axial forces that reflects the axial force applied to the turning shaft 14 is less than the distribution proportion DRf2 which is the total sum of distribution proportions which are individually set for a plurality of axial forces that does not reflect the force applied to the turning shaft 14. Accordingly, it is possible to give a more appropriate steering reaction force that reflects the force applied to the turning shaft 14 via the turning wheels 16 to a driver.

In the first to fourth embodiments and the other embodiments, the following configuration may be employed as the limiting axial force calculating units 82, 110, and 120. That is, when the distribution proportion DRf of the axial force (F2) that reflects the force applied to the turning shaft 14 is greater than the distribution proportion DRf2 of the axial force (F1, F8) that does not reflect the force applied to the turning shaft 14, the values of the limiting axial forces F4, F6, and F7 are decreased as the value of the distribution proportion DRf increases. The same is true when the distribution proportion DRf which is a total sum of distribution proportions which are individually set for one or two or more axial forces that reflects the axial force applied to the turning shaft 14 is greater than the distribution proportion DRf2 which is the total sum of distribution proportions which are individually set for a plurality of axial forces that does not reflect the force applied to the turning shaft 14. Accordingly, it is possible to curb calculation of the final axial force F5 with an excessive value and to give a more appropriate steering reaction force that reflects the force applied to the turning shaft 14 via the turning wheels 16 to a driver.

In the first to fourth embodiments, the following configuration may be employed as the axial force calculating unit 72. That is, the gains G1, G2, and G4 which are calculated based on the gain maps M2, M4, and M7 may be multiplied by the final axial force F5 (see FIG. 3) which is calculated by the adder 83 of the axial force calculating unit 72 instead of the virtual rack-end axial force F4pre (see FIG. 4), the curbing axial force F6pre (see FIG. 5), or the current-limiting axial force F7pre (see FIG. 6). In this case, it is also possible to curb calculation of the final axial force F5 with an excessive value.

In the first to fourth embodiments, the following configuration may be employed as the axial force calculating unit 72. That is, the gains G1, G2, and G4 which are calculated based on the gain maps M2, M4, and M7 may be multiplied by the estimated axial force F2 or the mixed axial force F3 that reflects the force applied to the turning shaft 14 instead of the virtual rack-end axial force F4pre (see FIG. 4), the curbing axial force F6pre (see FIG. 5), or the current-limiting axial force F7pre (see FIG. 6). In this case, it is also possible to curb calculation of the final axial force F5 with an excessive value.

What is claimed is:

1. A steering device comprising:
a turning shaft configured to turn turning wheels;
a steering mechanism including the turning shaft;
a motor configured to generate drive power that is applied to the steering mechanism; and
a control device configured to control the motor based on a command value that is calculated according to a steered state, wherein:
the control device includes a steering-range axial force calculating circuit, a limiting axial force calculating circuit, a final axial force calculating circuit, and an axial force adjusting circuit,
the steering-range axial force calculating circuit is configured to calculate a steering-range axial force including an axial force that reflects at least a force acting on the turning shaft via the turning wheels when a steering wheel is operated in a predetermined operation range,
the limiting axial force calculating circuit is configured to calculate a limiting axial force that is an axial force for virtually limiting an operation of the steering wheel,
the final axial force calculating circuit is configured to calculate a final axial force that is a final axial force reflected in the command value based on the steering-range axial force and the limiting axial force,
the axial force adjusting circuit is configured to adjust a value of the steering-range axial force, the limiting axial force, or the final axial force based on the axial force that reflects the force acting on the turning shaft when the final axial force reflects the limiting axial force, and
the axial force adjusting circuit is configured to decrease a degree of reflection of the steering-range axial force or the limiting axial force in the final axial force according to a ratio at which the axial force that reflects a force acting on the turning shaft occupies the steering-range axial force when the final axial force reflects the limiting axial force.

2. The steering device according to claim 1, wherein the final axial force calculating circuit is configured to calculate the final axial force by summing the steering-range axial force and the limiting axial force.

3. The steering device according to claim 1, wherein
the limiting axial force calculating circuit is configured to calculate at least one of a first limiting axial force, a second limiting axial force, and a third limiting axial force,
the first limiting axial force is an axial force for virtually limiting the operation range of the steering wheel,
the second limiting axial force is an axial force for virtually limiting the operation of the steering wheel when a turning operation of the turning wheels is limited, and
the third limiting axial force is an axial force for virtually limiting the operation of the steering wheel when a torque of the motor is limited to a value less than a torque that is inherently generated.

4. The steering device according to claim 1, wherein
the steering mechanism has a structure in which transmission of power between the steering wheel and the turning wheels is cut off or a structure in which transmission of power between the steering wheel and the turning wheels is intermittent, and
the motor is a reaction motor that generates a steering reaction force that is a torque in a direction opposite to an operation direction of the steering wheel as the drive power.

5. The steering device according to claim 1, wherein
the steering mechanism has a structure in which the steering wheel and the turning wheels are connected in a power-transmittable manner, and
the motor is an assist motor that generates a steering assist force that is a torque in a direction parallel to an operation direction of the steering wheel as the drive power.

6. A steering device comprising:
a turning shaft configured to turn turning wheels;
a steering mechanism including the turning shaft;
a motor configured to generate drive power that is applied to the steering mechanism; and
a control device configured to control the motor based on a command value that is calculated according to a steered state, wherein:
the control device includes a steering-range axial force calculating circuit, a limiting axial force calculating circuit, a final axial force calculating circuit, and an axial force adjusting circuit,
the steering-range axial force calculating circuit is configured to calculate a steering-range axial force including an axial force that reflects at least a force acting on the turning shaft via the turning wheels when a steering wheel is operated in a predetermined operation range,
the limiting axial force calculating circuit is configured to calculate a limiting axial force that is an axial force for virtually limiting an operation of the steering wheel,
the final axial force calculating circuit is configured to calculate a final axial force that is a final axial force reflected in the command value based on the steering-range axial force and the limiting axial force,
the axial force adjusting circuit is configured to adjust a value of the steering-range axial force, the limiting axial force, or the final axial force based on the axial force that reflects the force acting on the turning shaft when the final axial force reflects the limiting axial force,
the steering-range axial force is acquired by mixing a first axial force that reflects a force acting on the turning shaft and a second axial force that does not reflect a force acting on the turning shaft at a ratio that is set according to a vehicle state, and
the axial force adjusting circuit is configured to decrease the value of the limiting axial force according to the ratio at which the first axial force occupies the steering-range axial force when the final axial force reflects the limiting axial force.

7. A steering device comprising:
a turning shaft configured to turn turning wheels;
a steering mechanism including the turning shaft;
a motor configured to generate drive power that is applied to the steering mechanism; and
a control device configured to control the motor based on a command value that is calculated according to a steered state, wherein:
the control device includes a steering-range axial force calculating circuit, a limiting axial force calculating circuit, a final axial force calculating circuit, and an axial force adjusting circuit,
the steering-range axial force calculating circuit is configured to calculate a steering-range axial force including an axial force that reflects at least a force acting on the turning shaft via the turning wheels when a steering wheel is operated in a predetermined operation range, the limiting axial force calculating circuit is configured to calculate a limiting axial force that is an axial force for virtually limiting an operation of the steering wheel, the final axial force calculating circuit is configured to calculate a final axial force that is a final axial force reflected in the command value based on the steering-range axial force and the limiting axial force, the axial force adjusting circuit is configured to adjust a value of the steering-range axial force, the limiting axial force, or the final axial force based on the axial force that reflects the force acting on the turning shaft when the final axial force reflects the limiting axial force, the steering-range axial force is acquired by mixing a first axial force that reflects a force acting on the turning shaft and a second axial force that does not reflect a force acting on the turning shaft at a ratio that is set according to a vehicle state, and the axial force adjusting circuit is configured to decrease the value of the second axial force or the steering-range axial force according to the ratio at which the first axial force occupies the steering-range axial force when the final axial force reflects the limiting axial force.

* * * * *